US012300481B2

(12) United States Patent
Hartmer et al.

(10) Patent No.: US 12,300,481 B2
(45) Date of Patent: May 13, 2025

(54) CHARGE DETECTION FOR ION ACCUMULATION CONTROL

(71) Applicant: Thermo Fisher Scientific (Bremen) GmbH, Bremen (DE)

(72) Inventors: Ralf Günter Hartmer, Bremen (DE); Dmitry Grinfeld, Bremen (DE); Alexander Makarov, Bremen (DE); Frank Czemper, Bremen (DE); Robert Ostermann, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 206 days.

(21) Appl. No.: 18/314,506

(22) Filed: May 9, 2023

(65) Prior Publication Data

US 2023/0360901 A1 Nov. 9, 2023

(30) Foreign Application Priority Data

May 9, 2022 (GB) ..................................... 2206716
Mar. 30, 2023 (GB) ..................................... 2304687

(51) Int. Cl.
*H01J 49/42* (2006.01)

(52) U.S. Cl.
CPC ...... *H01J 49/4265* (2013.01); *H01J 49/4225* (2013.01)

(58) Field of Classification Search
CPC .... H01J 49/422; H01J 49/4225; H01J 49/426; H01J 49/4265; H01J 49/025; H01J 49/027
See application file for complete search history.

(56) References Cited

U.S. PATENT DOCUMENTS

| | | | | |
|---|---|---|---|---|
| 5,572,022 | A * | 11/1996 | Schwartz | H01J 49/147 250/282 |
| 6,555,814 | B1 | 4/2003 | Baykut et al. | |
| 6,872,938 | B2 | 3/2005 | Makarov et al. | |
| 7,399,962 | B2 | 7/2008 | Makarov | |
| 8,796,619 | B1 * | 8/2014 | Doroshenko | H01J 3/40 250/281 |
| 10,128,099 | B1 * | 11/2018 | Schwartz | H01J 49/4255 |
| 2014/0061460 | A1 * | 3/2014 | Hauschild | H01J 49/425 250/281 |

FOREIGN PATENT DOCUMENTS

| | | |
|---|---|---|
| WO | WO-2012160001 A1 | 11/2012 |
| WO | WO-2020121167 A1 | 6/2020 |
| WO | WO-2022157641 A1 | 7/2022 |

* cited by examiner

*Primary Examiner* — David E Smith

(57) ABSTRACT

Provided herein are methods and systems for controlling the number of ions in a batch of ions accumulated in an ion trap. The ion trap comprises one or more detection electrodes configured to detect image current signals from ions accumulated within the ion trap. An ion or group of ions passed to the ion trap is caused to impact upon one or more of the detection electrode(s) of the ion trap so as to provide a detected signal. An ion current or charge of the ion or group of ions is determined from the detected signal, and the determined ion current or charge of the ion or group of ions is used to control the number of ions in a batch of ions subsequently accumulated in the ion trap.

20 Claims, 10 Drawing Sheets

CHARGE DETECTION FOR ION ACCUMULATION CONTROL

CROSS-REFERENCE TO RELATED APPLICATIONS

This application claims priority to Great Britain Patent Application No. GB2206716.9, filed May 9, 2022, and to Great Britain Patent Application No. GB2304687.3, filed Mar. 30, 2023, the entire contents of the above applications being incorporated herein by reference.

FIELD OF THE INVENTION

The present invention relates to the field of mass spectrometry, and in particular to mass spectrometry employing image current detection of ions, such as Fourier Transform (FT) mass spectrometry using electrostatic traps such as electrostatic orbital traps.

BACKGROUND

Mass spectrometers are used to analyse a wide range of materials, including organic substances such as pharmaceutical compounds, environmental compounds, and biomolecules.

Many types of mass spectrometer use image current detection of ions. Fourier transformation of the detected image current is used to produce a mass spectrum (thereby giving rise to the name Fourier transform mass spectrometry (FTMS)). Such mass spectrometers typically employ ion traps. For example, Orbitrap™ instruments from Thermo Fisher Scientific employ a curved linear ion trap ("C-Trap") together with an electrostatic orbital trap to provide high-resolution accurate mass analysis.

It is often desirable to accumulate as many ions as possible in an ion trap, for example to improve the statistics of the collected data. However, undesirable space charge effects can occur at relatively high ion concentrations and can, for example, limit mass resolution and mass accuracy of analysis of the accumulated ions. Accordingly, it can be necessary to precisely control the total number of ions accumulated in an ion trap, for example to optimise the number of ions to be below, but as close as possible to, a limit for the ion trap such as a space-charge limit for the ion trap.

It can often be the case that the flux of ions from an ion source into an ion trap is highly variable. For example, where the ion source is connected to a separation device such as a liquid chromatography or capillary electrophoresis device, the ion flux from the ion source can vary over time by several order of magnitudes.

Therefore, numerous methods of automatic gain control (AGC) have been proposed to control the total number of ions accumulated in an ion trap despite a variable flux of ions into the trap. These methods typically make use of measurements or estimations of an earlier ion flux to estimate the present ion flux. The accumulation time (e.g. fill time) of ions into the trap is then adjusted based on the present ion flux estimation to control the total number of ions accumulated in the ion trap.

It is common to operate a mass spectrometer such that successive batches of ions are each accumulated in and analysed by an ion trap mass analyser. An estimation of an earlier ion flux can be made based on the mass analysis of a previous batch of ions, and this estimation can be used to estimate the present ion flux. Although this method can provide excellent results in a wide range of circumstances, it has been recognised that in some circumstances this method can suffer from under-representation of ions. This may be due to ion peaks appearing below the noise threshold or outside the mass range of the image current measurement. Signals in dense spectra can appear at reduced intensities due to interference effects. This effect is especially severe for mixtures of intact proteins where each protein has multiple isotopes with multiple charge states. Overall, this so-called "dark matter" can hide up to 50-70% of ion charge in such extreme cases.

An earlier ion flux can also or instead be estimated by measuring the ion current of a batch of ions ejected to an electrometer positioned elsewhere in the instrument outside of the ion trap (for example as described in commonly assigned International Patent Publication No. WO2012/160001). Although this method can provide improved results, it requires additional hardware with ultra-sensitive electronics and elaborate control.

It is believed that there remains scope for improvements to apparatus and methods for mass analysis.

SUMMARY

A first aspect provides a method of operating an analytical instrument that comprises an ion trap, the ion trap comprising one or more detection electrodes, wherein one or more of the one or more detection electrodes are configured to detect image current signals from ions accumulated within the ion trap, the method comprising:

- operating the instrument in a first mode of operation in which ions passed to the ion trap are caused to impact upon one or more of the detection electrode(s) of the ion trap, and passing a group of ions to the ion trap such that the group of ions is caused to impact upon one or more of the detection electrode(s) of the ion trap so as to provide a detected signal;
- determining an ion current or charge of the group of ions from the detected signal; and
- using the determined ion current or charge of the group of ions to control the number of ions in a batch of ions subsequently accumulated in the ion trap.

The method is performed using an ion trap that comprises one or more detection electrodes configured to detect image current signals from ions accumulated within the ion trap. In particular, the ion trap may be an ion trap mass analyser such as an electrostatic orbital trap mass analyser. The instrument may be operated in a mass analysis mode of operation, in which ions passed to the ion trap are caused to remain within the trap without impacting upon the detection electrode(s). The ion trap is configured such that its detection electrode(s) can be used to detect image current signals from a batch of ions held within the ion trap. Fourier transformation of an image current signal detected by the detection electrode(s) may be used to produce a mass spectrum of a batch of ions within the trap.

The inventors have now recognised that in addition to this mass analysis mode of operation, the detection electrode(s) of the ion trap can be used in another mode of operation to determine an ion current of or a (total amount of) charge of a group of ions by deliberately causing that group of ions to impact upon one or more of the detection electrode(s). As will be described in more detail below, this additional mode of detection does not require significant changes to the ion trap or its detection circuitry.

Furthermore, the inventors have recognised that such ion current or charge measurements can be used in automatic gain control (AGC) procedures. Thus, the determined ion current or charge of a group of ions can be used to control the number of ions in a batch of ions subsequently accumulated in the ion trap.

By using the detection electrode(s) of the ion trap itself to provide an ion current or charge measurement for the AGC procedure, there is no need to provide additional hardware elsewhere in the instrument for this purpose (e.g. as is the case in WO2012/160001). This can then beneficially reduce the complexity, size and cost of the instrument, as well as increase its reliability and robustness.

Furthermore, the inventors have recognised that using the detection electrode(s) of the ion trap itself for ion current or charge measurements can improve the accuracy of the AGC procedure, i.e. can result in more accurate control of the number of ions in a batch of ions accumulated in the ion trap. As will be described in more detail below, this is because the measurements in accordance with the method will more accurately take account of inevitable ion losses during the process of passing ions to the ion trap; whereas measurements made using an electrometer positioned elsewhere in the instrument outside of the ion trap will not take account of these losses and will instead take account of the different ion losses that occur during the process of passing ions to the electrometer. The inventors have found that these differences can be substantial, and can be mass- and analyte-dependent.

It will be appreciated, therefore, that embodiments provide improved apparatus and methods for mass analysis.

The ion trap may comprise any suitable ion trap having at least one, such as a plurality of (e.g. two), detection electrodes configured to detect image current signals from ions accumulated within the ion trap.

The ion trap may have a trapping volume therein in which ions may be trapped. The ion trap may be an electrostatic trap, such as an electrostatic orbital trap. The ion trap may have an inner electrode arranged along an axis and two outer detection electrodes spaced apart along the axis and surrounding the inner electrode. When the ion trap is operated in a mass analysis mode of operation, ions trapped within the ion trap may oscillate with a frequency which may depend on their mass-to-charge ratio and which can be detected using image current detection. The ions may perform substantially harmonic oscillations along the axis in an electrostatic field whilst orbiting around the inner electrode. The ion trap may be an Orbitrap™ mass analyser from Thermo Fisher Scientific. Further details of an Orbitrap™ mass analyser can be found, for example, in U.S. Pat. No. 5,886,346.

The ion trap can alternatively be any other suitable type of ion trap having one or more detection electrodes configured to detect image current signals from ions accumulated within the ion trap. Examples of suitable such ion traps include, for example, multi-reflection and multi-deflection electrostatic traps and time-of-flight analysers, orbital traps (including of Cassini type) with one or multiple inner electrodes, linear and 3D traps with RF trapping, and so on.

The ion trap may comprise detection circuitry configured to provide an output signal based on the detected image current signals. An image current may be detected using a differential amplifier connected to a first outer detection electrode and a second outer detection electrode of the trap.

The analytical instrument may be a mass spectrometer, e.g. comprising an ion source. Ions may be generated from a sample in the ion source. The ions may be passed from the ion source to (and in the mass analysis mode of operation, accumulated in) the ion trap, e.g. via one or more other ion optical devices of the instrument.

In some embodiments, the instrument is configured such that ions may be passed to the ion trap in the form of an ion beam, e.g. without having been accumulated before being passed to the ion trap. Thus, ions may be accumulated directly within the ion trap (e.g. in the mass analysis mode of operation). In these embodiments, the number of ions in a batch of ions accumulated within the ion trap can be controlled by controlling an accumulation time (e.g. fill time) of ions into the ion trap. This in turn can be controlled by operating a gate or lens of the ion trap and/or a gate or lens within the instrument upstream of the ion trap (between the ion source and the ion trap) in an open (transmitting) mode of operation for a desired amount of time (and otherwise operating the gate or lens in a closed (non-transmitting) mode of operation).

In embodiments, the ion trap is a primary ion trap, and ions are passed to the primary ion trap from a secondary ion trap arranged upstream of the primary ion trap. Ions may be initially accumulated within the secondary ion trap, and then passed to the primary ion trap so as to accumulate the ions within the primary ion trap (in the mass analysis mode of operation), e.g. in the form of a pulse of ions. The secondary ion trap may be referred to as an injection device for injecting ions into the primary ion trap.

In these embodiments, the number of ions in a batch of ions accumulated within the primary ion trap can be controlled by controlling an accumulation time (e.g. fill time) of ions into the secondary ion trap. This in turn can be controlled by operating a gate or lens of the secondary ion trap and/or a gate or lens within the instrument upstream of the secondary ion trap (between the ion source and the secondary ion trap) in an open (transmitting) mode of operation for a desired amount of time (and otherwise operating the gate or lens in a closed (non-transmitting) mode of operation).

The secondary ion trap may comprise any suitable ion trap, such as a linear ion trap or a curved linear ion trap (C-trap). The secondary ion trap may be used to cool the accumulated ions prior to injecting them into the primary ion trap. The secondary ion trap may be configured such that ions can be ejected from the secondary ion trap to the primary ion in a pulsed manner. The secondary ion trap may have an axis and may be operable to eject ions from the secondary ion trap orthogonally to the axis to the primary ion trap. An example of a suitable secondary ion trap in the case of injection into an electrostatic orbital trap mass analyser is a curved linear trap (C-trap), as described for example in WO 2008/081334.

Thus, the method may comprise generating ions in an ion source, transmitting the ions to and accumulating ions in a secondary ion trap, and then injecting the accumulated ions, optionally as a pulse, to the primary ion trap, thereby to accumulate a batch of ions in the primary ion trap (e.g. in the mass analysis mode of operation). Thus, as used herein, a step of accumulating ions within a (primary) ion trap may comprise either (i) collecting ions over a prolonged period of time (an accumulation or fill time) directly in the (primary) ion trap, or (ii) capturing a pulse of ions (which may have been formed by collecting ions over a prolonged period of time directly in a secondary ion trap) in the (primary) ion trap, without collecting ions over a prolonged period of time directly in the (primary) ion trap.

In embodiments, ions may be passed from the secondary ion trap to the primary ion trap via one or more ion optical devices arranged between the secondary ion trap and the primary ion trap. Thus, the instrument may comprise one or more ion optical devices arranged between the secondary ion trap and the primary ion trap.

The one or more ion optical devices may include any suitable such devices, such as for example one or more lenses. One or more lenses may be provided and configured to condition the pulse of ions as it passes from the secondary ion trap to the primary ion trap, e.g. so that it has a suitable form (e.g. shape, energy, etc.) to be properly received and trapped by the primary ion trap. The one or more lenses may comprise any type and combination of one or more lenses, such as for example, a so-called V-lens, Z-lens and/or focus lens.

In embodiments, the one or more ion optical devices also includes a deflector, e.g. in the form of at least one deflector electrode. The deflector may be arranged immediately adjacent to an entrance aperture or slot of the primary ion trap, e.g. between the one or more lenses and the (entrance aperture or slot of the) primary ion trap. The deflector may be configured to direct the pulse of ions into the primary ion trap (e.g. in the mass analysis mode of operation), e.g. so as to improve the trapping efficiency of the primary ion trap. In embodiments, a voltage may be applied to the deflector electrode and may be dynamically altered, e.g. as the ions enter the primary ion trap.

The instrument may optionally also comprise one or more further ion optical devices, ion traps and/or mass selectors upstream or downstream of the primary ion trap and/or secondary ion trap. For example, the instrument may comprise a quadrupole or multipole mass selector or filter upstream of the primary ion trap and/or secondary ion trap for mass selecting the ions which are transmitted to the primary ion trap and/or secondary ion trap. Thus, when required, only ions of a limited range of mass-to-charge ratio (m/z) may be transmitted to the primary ion trap and/or secondary ion trap.

The instrument may comprise a collision or reaction cell, which may be downstream of the secondary ion trap. The collision or reaction cell may be for processing the ions, e.g. by fragmenting the ions by collisions and/or interactions with a collision gas and/or a reagent in the collision or reaction cell, and/or by further cooling the ions through collisions with a gas at lower energies that do not result in the ions being fragmented. After processing of ions in the collision or reaction cell, the ions may be returned upstream to the secondary ion trap for injection of the processed ions to the primary ion trap. In these embodiments, the number of ions in a batch of ions accumulated within the primary ion trap can be controlled by controlling an accumulation time (e.g. fill time) of ions into the collision or reaction cell. This in turn can be controlled by operating a gate or lens of the secondary ion trap and/or a gate or lens within the instrument upstream of the secondary ion trap (between the ion source and the secondary ion trap) in an open (transmitting) mode of operation for a desired amount of time (and otherwise operating the gate or lens in a closed (non-transmitting) mode of operation).

In embodiments, the instrument is operable in at least two modes of operation: a (first) charge or current detecting mode of operation, and a (second) mass analysis mode of operation.

In the mass analysis mode of operation, ions that are passed to the (primary) ion trap (e.g. from the secondary ion trap) are accumulated within the (primary) ion trap, e.g. such that image current signals of the ions can be detected using the detection electrodes so as to provide a detected signal that is indicative of the mass to charge ratio(s) of the ions. Thus, when the instrument is operated in its mass analysis mode of operation, at least some, most or all of the ions passed to the ion trap (e.g. from the secondary ion trap) are caused to remain within the trap, without impacting upon the detection electrode(s) (or the inner electrode(s)). Where the ion trap is an electrostatic orbital trap, at least some, most or all of the ions passed to the ion trap may be caused enter stable orbits within the ion trap around the inner electrode of the ion trap.

In this mode of operation, when ions are passed to the ion trap (e.g. from the secondary ion trap), at least one voltage of a set of one or more voltages applied to one or more electrodes of the ion trap and/or at least one voltage of a set of one or more voltages applied to one or more of the ion optical device(s) arranged between the secondary ion trap and the primary ion trap may be dynamically altered. In particular, a voltage applied to the inner electrode of the ion trap may be dynamically altered, e.g. as ions enter the ion trap. Similarly, a voltage applied to the deflector electrode may be dynamically altered, e.g. as the ions enter the primary ion trap. In embodiments, the voltage applied to the inner electrode and/or the voltage applied to the deflector is altered (e.g. increased or decreased) from an initial "injection" voltage to a "detection" voltage, e.g. as the ions enter the primary ion trap. These voltages may be selected so as to cause some, most or all of the ions that are passed to the ion trap to enter stable orbits within the ion trap, e.g. around the inner electrode of the ion trap.

In this mode of operation, once ions have entered stable orbits within the ion trap, the detection electrode(s) may be used to detect image current signals from the ions held within the ion trap, e.g. so as to provide a detected signal that is indicative of the mass to charge ratio(s) of the ions. Fourier transformation of image current signal(s) detected by the detection electrode(s) may be used to produce a mass spectrum of a batch of ions within the trap.

In contrast with the mass analysis mode of operation, in the charge or current detecting mode of operation, ions that are passed to the ion trap (e.g. from the secondary ion trap) are caused to impact upon one or more of the detection electrode(s) of the ion trap, without being stably trapped within the ion trap. Thus, when the ion trap is operated in its charge or current detecting mode of operation, most or all of the ions passed to the ion trap (e.g. from the secondary ion trap) are caused to impact upon one or more of the detection electrode(s) of the ion trap, i.e. without adopting stable (orbital) trajectories within the trap.

Ions may be caused to impact upon the detection electrode(s) in any suitable manner. In embodiments, in this mode of operation, when ions are passed to the ion trap (e.g. from the secondary ion trap), one or more or all of the voltages of the set of voltage(s) applied to one or more or all of the electrodes of the ion trap and/or one or more or all of the voltages of the set of voltage(s) applied to one or more or all of the ion optical device(s) arranged between the secondary ion trap and the primary ion trap are held constant, i.e. are DC voltage(s) and are not dynamically altered. The voltage or voltages may be held constant for some, most or all of the time during which ions are passed to the ion trap, particularly for most or all of the time during which ions are entering the ion trap. Typically, the constant voltage or voltages are needed for a few tens of microseconds in order to cause the ions to impact upon the detection electrode(s).

In embodiments, all of the voltages of the set of voltages applied to the electrodes of the ion trap and all of the voltages of the set of voltages applied to the ion optical device(s) arranged between the secondary ion trap and the primary ion trap are held constant, i.e. are not dynamically altered, for some, most or all of the time during which ions are passed to and/or for most or all of the time during which ions are entering the trap. In particular, the voltage applied to the inner electrode of the ion trap may be held constant for some, most or all of the time during which ions are passed to the ion trap (and for most or all of the time during which ions enter the ion trap). Similarly, the voltage applied to the deflector electrode may be held constant for some, most or all of the time during which the ions are passed to the ion trap (and for most or all of the time during which ions enter the primary ion trap). The use of static (DC) voltages has the effect of causing most or all of the ions that are passed to the ion trap (e.g. from the secondary ion trap) to impact upon one or more of the detection electrode(s) of the ion trap, i.e. without entering adopting stable (orbital) trajectories within the ion trap.

Ions impacting upon the one or more of the detection electrode(s) provides a detected signal that is indicative of (e.g. proportional to) the total charge or current of the ions.

In the method, a group of ions is passed to the ion trap when the instrument is being operated in its charge or current detecting mode of operation. The group of ions is accordingly caused to impact upon one or more of the detection electrode(s) of the ion trap so as to provide a detected signal, which is indicative of (e.g. proportional to) the total charge or current of the group of ions. Thus, the current or charge of the group of ions is determined (e.g. estimated) from the detected signal.

Where, as described above, ions are passed to the ion trap in the form of an ion beam, e.g. without having been accumulated before being passed to the ion trap, the ions impacting upon the one or more of the detection electrode(s) may provide a detected signal which is indicative of (e.g. proportional to) the current (charges per second) of the ions, and therefore may be indicative of the ion flux into the ion trap.

Where, as described above, a group of ions is initially accumulated in a secondary ion trap and then passed to the primary ion trap, the group of ions impacting upon the one or more of the detection electrode(s) may provide a detected signal which is indicative of (e.g. proportional to) the total charge of the group of ions. For example, the total integrated signal (i.e. area under the curve) may be indicative of (e.g. proportional to) the total charge of the group of ions. In these embodiments, the group of ions may be initially accumulated in the secondary ion trap using a set accumulation time (fill time). With knowledge of the fill time and the measured total charge of the group of ions, the (earlier) ion flux into the primary ion trap can be determined (e.g. estimated).

In the charge or current detecting mode of operation, ions passed to the (primary) ion trap may be separated in time according to their mass to charge ratio (m/z) before impacting upon the one or more detection electrode(s). That is, ions may separate according to their mass to charge ratio (m/z) between the secondary ion trap and the primary ion trap, e.g. in the manner of a time-of-flight mass analyser. Faster moving ions with a lower m/z may arrive at the one or more detection electrode(s) ahead of slower moving ions with a larger m/z. Thus, the detected signal may be indicative of a mass to charge ratio (m/z) distribution of the group of ions. Equally, the method may comprise determining the ion current or charge of the group of ions from the detected signal that is indicative of the mass to charge ratio (m/z) distribution of the group of ions. As will be described further below, this m/z dependent charge detection is particularly beneficial in that it allows most or all ions to be detected and identified, independently of an expected m/z distribution, e.g. that may have been expected or predicted by an operator of the instrument.

As described above, the ion trap may comprise detection circuitry configured to provide an output signal based on the detected image current signals, where the detection circuitry may comprise a differential amplifier. The detection circuitry, particularly the differential amplifier, may in turn comprise a set of one or more transistors. In embodiments, the same detection circuitry, particularly the same differential amplifier, more particularly the same set of one or more transistors, is used for both the image current detection (in the second mass analysis mode of operation) and for the ion current or charge detection (in the first charge or current detecting mode of operation). Using the same circuitry in this manner beneficially reduces the complexity of the system, and avoids the need for relatively complicated and noisy switches.

In embodiments, a background signal may be pre-measured by operating the instrument in the ion current or charge mode of operation without generating ions so as to provide a detected background signal. The background signal may be subtracted from the detected signal which is indicative of the total charge of the group of ions, i.e. to provide a signal which is more accurately indicative of the total charge of the group of ions. This more accurate signal indicative of the total charge of the group of ions may be used in the methods described herein, i.e. to control the number of ions in a batch of ions subsequently accumulated in the ion trap.

In the method, the determined (e.g. estimated) ion current or charge of the group of ions is used to control the number of ions in a batch of ions subsequently accumulated in the ion trap.

In embodiments, the instrument is operated such that successive batches of ions (from the ion source) are each accumulated in and analysed by the ion trap. (The ion trap may be emptied of all ions before accumulating its next batch of ions.) The determined (e.g. estimated) ion current or charge of the group of ions may be used to control the number of ions in only a single batch of ions subsequently accumulated in the ion trap, or may be used to control the number of ions in each of plural batches of ions subsequently accumulated in the ion trap. Similarly, only one determined (e.g. estimated) ion current or charge of a group of ions may be used to control the number of ions in batch(es) of ions subsequently accumulated in the ion trap, or multiple such determinations (e.g. estimations), e.g. one in respect of each group of multiple groups of ions may be used to control the number of ions in batch(es) of ions subsequently accumulated in the ion trap.

As described above, the number of ions accumulated in the (primary) trap may be controlled by controlling an accumulation time (e.g. fill time) of ions into the (primary) ion trap, or by controlling an accumulation time (e.g. fill time) of ions into the secondary ion trap. Thus, the method may comprise using the determined ion current or charge of the group of ions to control the accumulation time (e.g. fill time) of ions into the (primary) ion trap, or to control the accumulation time (e.g. fill time) of ions into the secondary ion trap for the subsequent batch of ions. In particular, the determined ion current or charge of the group of ions may be used when determining a target fill time for the subsequent batch of ions.

In some embodiments, the target fill time may be determined directly from the determined ion current or charge of the group of ions (or directly from multiple such ion current or charge determinations). For example, as described above, the determined ion current(s) or charge(s) of the group(s) of ions can be used to determine one or more (earlier) ion flux(es), which can be used to determine (e.g. estimate) a present ion flux, and then the target fill time can be determined based on the determined (e.g. estimated) present ion flux, e.g. so as to suitably control the number of ions within the subsequent batch(es) of ions accumulated in the ion trap.

However, where the instrument is operated such that successive batches of ions are each accumulated in and analysed by the ion trap, and where the ion flux is highly variable, such a method may require relatively frequent ion current or charge measurements to ensure suitably precise control of the number of ions in each batch of ions. Frequent ion current or charge measurements could, however, reduce the frequency of mass analysis measurements, and so might reduce the overall duty cycle of the instrument.

Therefore, in embodiments, the instrument is operated such that successive batches of ions (from the ion source) are each accumulated in and analysed by the ion trap (i.e. such that successive mass analysis measurements are made), and such that the total charge of some, most or each successive batch of ions is determined from the mass analysis of that batch of ions by the ion trap. For example, for each batch of ions, a mass spectrum may be produced, and all of the signal in the mass spectrum above a noise threshold may be summed, and converted to charge (or number of ions), e.g. using a conversion coefficient (which may, e.g., be determined during calibration).

The determined total ion charge may be then used to calculate a target fill time for one or more subsequent batches of ions. Thus, a target fill time may be based on, e.g.: a previous mass analysis of a previous batch of ions (especially a total ion content or charge determined therefrom), the known fill time of the previous batch of ions into the ion trap, and a desired or target maximum number of ions (hence a target total ion content or charge) in the ion trap.

In addition to this, a determination of the ion current or charge of a group of ions in the manner described above may be made intermittently between the successive mass analysis measurements. Thus, the instrument may be operated in its charge or current detecting mode of operation intermittently between being operating in its mass analysis mode of operation. The ion current or charge determination may be carried out periodically and less frequently than the mass analysis measurements. For example, an ion current or charge determination may be made once every few seconds, between mass analysis measurements.

The ion current or charge determined using the ion current or charge determination mode of operation may be compared to the ion current or charge determined using a corresponding mass analysis measurement. For example, a ratio of the ion current or charge determined using the ion current or charge determination to the ion current or charge determined using the mass analysis measurement may be determined, and this ratio may be compared to an expected ratio. If the ratio differs significantly from the expected ratio, one or more subsequent target fill times may be suitably adjusted, e.g. to prevent overfilling or underfilling ion trap.

Accordingly, the ion current or charge determination(s) may be used in effect to calibrate or adjust the target fill time(s) determined on the basis of the mass analysis measurements. This may comprise scaling (up or down) the determined target fill time(s). The adjustment may comprise scaling the target fill time by the ratio of the total ion content as determined from the ion current or charge determination mode of operation to the total ion content as determined from the corresponding mass analysis measurement.

Thus, the ion current or charge determination mode of operation may be employed, e.g. occasionally, to define a factor by which the target fill time determined from a mass analysis of a batch of ions should be scaled up or down.

These methods result in precise control of the number of ions in each successive batch of ions despite a variable ion flux, and without significantly reducing the overall duty cycle of the instrument.

In embodiments, where the (primary) ion trap is a mass analyser, the (or each) subsequent batch of ions whose number of ions is controlled is a batch of ions accumulated within the ion trap for the purposes of mass analysing that batch of ions. Thus, the method may comprise controlling the number of ions, i.e. ion content, in a batch of ions which are accumulated in the mass analyser to obtain an analytical mass spectrum (analytical scan). The method may comprise accumulating the batch of ions within the ion trap (e.g. using the adjusted target fill time), and detecting (analysing) the batch of ions within the ion trap using the detection electrode(s) so as to provide a detected image current signal. A mass spectrum of the batch of ions may be obtained from the detected image current signal e.g. using Fourier transformation.

In embodiments, the target fill time is determined (e.g. adjusted) from the determined ion current or charge using a calibration function. The calibration function may be a calibration function that has been predetermined, e.g. using an earlier-performed calibration procedure.

The one or more detection electrode(s) of the ion trap upon which ions are caused to impact in the first mode of operation (so as to provide a detected signal from which the ion current or charge of the group of ions is determined) may be the same electrode(s) as the one or more detection electrode(s) that are configured to detect image current signals from ions accumulated within the ion trap.

Alternatively, the one or more detection electrode(s) of the ion trap upon which ions are caused to impact in the first mode of operation (so as to provide a detected signal from which the ion current or charge of the group of ions is determined) may be different electrodes to the one or more detection electrode(s) that are configured to detect image current signals from ions accumulated within the ion trap. For example, one or more additional dedicated ion current or charge detecting electrode(s) may be provided for this purpose. The one or more additional ion current or charge detecting electrode(s) may be arranged between the secondary ion trap and the primary ion trap, within the primary ion trap or adjacent to the primary ion trap, e.g. behind the primary ion trap. The one or more additional ion current or charge detecting electrode(s) may be electrically connected to the one or more detection electrode(s) that are configured to detect image current signals from ions accumulated within the ion trap.

A second aspect provides a method of operating an analytical instrument that comprises a primary ion trap and a secondary ion trap arranged upstream of the primary ion trap, the method comprising:

accumulating a group of ions within the secondary ion trap;

operating the instrument in a first mode of operation in which ions passed from the secondary ion trap to the primary ion trap are caused to impact upon one or more electrodes arranged between the secondary ion trap and the primary ion trap, within the primary ion trap or adjacent to the primary ion trap, and passing the group of ions from the secondary ion trap to the primary ion trap such that the group of ions is caused to impact upon the one or more electrodes so as to provide a detected signal;

determining an ion current or charge of the group of ions from the detected signal; and using the determined ion current or charge of the group of ions to control the number of ions in a batch of ions subsequently accumulated in the primary and/or secondary ion trap.

These aspects and embodiments can, and in embodiments do, include any one or more or each of the optional features described herein.

In these aspects and embodiments, although additional hardware may be required, the accuracy of the AGC procedure can still be improved, because the measurements will more accurately take account of inevitable ion losses during the process of passing ions from the secondary ion trap to the primary ion trap; whereas measurements made using an electrometer positioned elsewhere in the instrument will not take account of these losses and will instead take account of the different ion losses that occur during the process of passing ions to the electrometer.

In these aspects and embodiments, the one or more electrodes may be detection electrode(s) of an independent ion current or charge detector, such as an electrometer, e.g. a collector plate or a Faraday cup.

Alternatively, the primary ion trap may comprise one or more detection electrodes configured to detect image current signals from ions accumulated within the primary ion trap, and the one or more electrodes are electrically connected to one or more of the detection electrode(s) of the primary ion trap.

In these aspects and embodiments, the one or more electrodes may be located either (i) between the secondary ion trap and the primary ion trap, e.g. adjacent to the deflector electrode; (ii) within the primary ion trap, e.g. directly behind the entrance aperture or slot of the primary ion trap; or (iii) adjacent to the primary ion trap, e.g. behind the primary ion trap, whereby ions passed from the secondary ion trap to the primary ion trap can be either trapped within the primary ion trap or can be caused to travel beyond the primary ion trap and to impact upon the one or more electrodes (e.g. by suitable control of a voltage applied to a defector electrode).

In particular embodiments, an additional ion current or charge detecting electrode is arranged adjacent to the deflector, such that when a deflection voltage is not applied to (is other than applied to) the deflector (e.g. when no voltage is applied to the deflector or when a (suitably small) DC voltage is applied to the deflector), most or all ions will impact upon the ion current or charge detecting electrode when they are passed from the secondary ion trap to the primary ion trap (and such that when a deflection voltage is applied to the deflector, most or all ions will enter the primary ion trap without impacting upon the ion current or charge detecting electrode when they are passed from the secondary ion trap to the primary ion trap). The additional electrode may be electrically connected (e.g. welded) to one or more of the one or more detection electrode(s) that are configured to detect image current signals from ions accumulated within the ion trap.

A further aspect provides a non-transitory computer readable storage medium storing computer software code which when executed on a processor performs the method(s) described above.

A further aspect provides a control system for an analytical instrument such as a mass spectrometer, the control system configured to cause the analytical instrument to perform the method(s) described above.

A further aspect provides an analytical instrument, such as a mass spectrometer, comprising the control system described above.

A further aspect provides an analytical instrument, such as a mass spectrometer, comprising:

an ion source;

an ion trap, the ion trap comprising one or more detection electrodes, wherein one or more of the one or more detection electrodes are configured to detect image current signals from ions accumulated within the ion trap; and a control system configured to:

operate the instrument in a first mode of operation in which ions passed to the ion trap are caused to impact upon one or more of the detection electrode(s) of the ion trap, and cause a group of ions from the ion source to be passed to the ion trap such that the group of ions impacts upon one or more of the detection electrode(s) of the ion trap so as to provide a detected signal;

determine an ion current or charge of the group of ions from the detected signal; and use the determined ion current or charge of the group of ions to control the number of ions in a batch of ions subsequently accumulated in the ion trap.

A further aspect provides an analytical instrument, such as a mass spectrometer, comprising:

an ion source;

a primary ion trap;

a secondary ion trap arranged upstream of the primary ion trap;

one or more electrodes arranged between the secondary ion trap and the primary ion trap, within the primary ion trap or adjacent to the primary ion trap; and a control system configured to:

accumulate a group of ions from the ion source within the secondary ion trap;

operate the instrument in a first mode of operation in which ions passed from the secondary ion trap to the primary ion trap are caused to impact upon the one or more electrodes, and cause the group of ions to be passed from the secondary ion trap to the primary ion trap such that the group of ions is caused to impact upon the one or more electrodes so as to provide a detected signal;

determine an ion current or charge of the group of ions from the detected signal; and use the determined ion current or charge of the group of ions to control the number of ions in a batch of ions subsequently accumulated in the primary and/or secondary ion trap.

These aspects and embodiments can, and in embodiments do, include any one or more or each of the optional features described herein.

Embodiments provide a method of controlling ion charge injected into an ion trap with image current detection, the method comprising (i) detuning voltages on the trap to facilitate landing of ions on one or more electrodes of the trap used for image current detection, (ii) storing ions in an external pulsed trap, followed by injecting the ions into the trap, and (iii) measuring the electric signal on at least one of the electrodes of the trap used for image current detection during a time period less than 1 ms.

The ion trap may be an electrostatic trap comprising at least one inner electrode and at least two outer electrodes. The measured image current electric signal may be used to control the number of charges accumulated in the external pulsed trap. The measured image current electric signal may be used to control the filling time for the external pulsed trap.

An electric signal may be measured from the first outer electrode equipped with an injection slot. An electric signal may be measured from the second outer electrode opposite to the first outer electrode.

A background signal may be pre-measured without ion injection and subtracted from the detected signal. A background signal may be pre-measured without ion injection and its integral over time may be subtracted from the integral over time of the detected signal.

The measured signal may be further used for automatic calibration of the ion number in a following injection of ions into the electrostatic orbital trap.

As used herein, an "ion" is an atom or a molecule having a net (positive or negative) electrical charge, i.e. an ion is a charged particle. An "ion" can be a cation or an anion. An ion can be formed by addition or subtraction of one or more electrons or of one or more protons from an atom or a molecule.

It will be understood that, as used herein, the terms a "group of ions" and a "batch of ions" are convenient labels intended to aid clarity and understanding. In practice, a "group of ions" and a "batch of ions" are equivalent entities. That is, each respective "group" or "batch" of ions comprises a plurality of ions, e.g. where all ions within a respective group or batch have the same polarity.

DESCRIPTION OF THE DRAWINGS

Various embodiments will now be described in more detail with reference to the accompanying Figures, in which.

DETAILED DESCRIPTION

Figure 1:
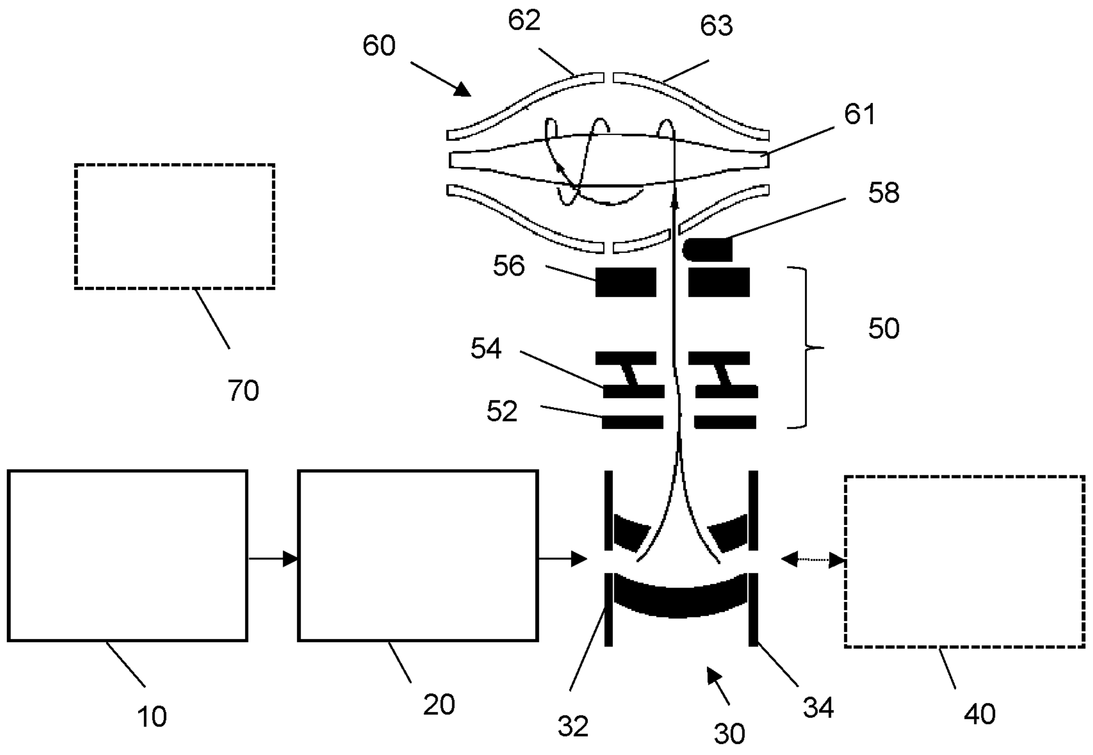
FIG. 1 shows schematically a mass spectrometer in accordance with embodiments.

FIG. 1 illustrates schematically a mass spectrometer that may be operated in accordance with embodiments. As shown in FIG. 1, the mass spectrometer includes an ion source 10, one or more ion transfer stages 20, a mass analyser 60 in the form of a primary ion trap, and a secondary ion trap 30.

The ion source 10 is configured to generate ions from a sample. The ion source 10 can be any suitable continuous or pulsed ion source, such as an electrospray ionisation (ESI) ion source, a MALDI ion source, and atmospheric pressure ionisation (API) ion source, a plasma ion source, an electron ionisation ion source, a chemical ionisation ion source, and so on. More than one ion source may be provided and used. The ions may be any suitable type of ions to be analysed, e.g. small and large organic molecules, biomolecules, DNA, RNA, proteins, peptides, fragments thereof and the like.

The ion source 10 may be coupled to a separation device such as a liquid chromatography separation device or a capillary electrophoresis separation device (not shown), such that the sample which is ionised in the ion source 10 comes from the separation device.

The ion transfer stage(s) 20 are arranged downstream of the ion source 10 and may include an atmospheric pressure interface and one or more ion guides, lenses and/or other ion optical devices configured such that some or all of the ions generated by the ion source can be transferred from the ion source 10 to the secondary ion trap 30. The ion transfer stage(s) 20 may include any suitable number and configuration of ion optical devices, for example optionally including one or more RF and/or multipole ion guides, one or more ion guides for cooling ions, one or more mass selective ion guides, and so on.

The secondary ion trap 30 is arranged downstream of the ion transfer stage(s) 20 and is configured to receive and accumulate ions from the ion source 10 (via the one or more ion transfer stages 20).

The secondary ion trap 30 can comprise any suitable ion trap, such as a quadrupole ion trap. The ion trap 30 may be elongated in an axial direction (thereby defining a trap axis) in which the ions enter the trap. Ions may be trapped radially in the trap 30 by applying RF voltage(s) to trapping (e.g. rod) electrodes of the trap. As shown in FIG. 1, the secondary ion trap 30 may be a curved linear ion trap (C-trap), i.e. where the trapping rod electrodes are curved. However, the ion trap 30 may be any other suitable type of ion trap, such as for example a linear ion trap.

The ion trap 30 includes an entrance lens or gate 32 and an exit lens or gate 34. The entrance lens 32 can be operated in an open mode, in which ions (from the ion source 10) can pass the entrance lens and enter the ion trap 30, or a closed mode in which ions (from the ion source 10) cannot pass the entrance lens 32 and do not enter the ion trap 30. When the entrance lens 32 is operated in its closed mode, ions already within the ion trap 30 will not be able to leave the ion trap via the entrance lens 32. Similarly, the exit lens 34 can be operated in an open mode, in which ions can pass the exit lens and leave the ion trap 30, or a closed mode in which ions cannot pass the entrance lens and do not leave the ion trap. The entrance lens 32 (the exit lens 34) can be closed or opened by applying a suitable voltage to the entrance lens 32 (to the exit lens 34).

Ions from the ion source 10 can be accumulated in the ion trap 30 by operating the exit lens 34 in its closed mode, while operating the entrance lens 32 in its open mode. After a desired ion fill time of ions into the ion trap 30, the entrance lens 32 can be closed (by altering the voltage applied to the entrance lens 32) such that ions cannot pass out of the trap 30 and such that ions from the ion source 10 can no longer enter the ion trap 30. In some embodiments, more accurate gating of the incoming ion beam into the trap 30 can be provided by a lens or gate electrode within the ion transfer stage(s) 20 upstream of the secondary ion trap. In these embodiments, the lens or gate electrodes may be configured such that the transmission of ions into the ion trap 30 can be switched on or off.

Thus, the mass spectrometer is configured such that ions can be accumulated in the secondary ion trap 30 with an adjustable accumulation time (fill time). By controlling the fill time of ions into the trap, where the flux of ions into the trap 30 is known or can be approximated, the total number of ions accumulated in the ion trap 30 can be controlled.

As illustrated by FIG. 1, once accumulated in the secondary ion trap 30, ions within the trap can be ejected into the primary ion trap 60. The ions may be ejected from the secondary trap 30 in a direction orthogonal to the axis of the trap (orthogonal ejection), for example by applying one or more suitable DC voltages to the ion trap 30.

The ions may be injected into the primary ion trap 60 via one or more lenses 50 such as a Z-lens 54, and a deflector electrode 58. As shown in FIG. 1, the one or more lenses 50 may include a so-called V-lens 52, followed by a Z-lens 54, followed by a high voltage (HV) focus lens 56.

The primary ion trap 60 is arranged downstream of the secondary ion trap 30 and is configured to receive and accumulate ions from the secondary ion trap 30 (via the one or more lenses 50 and the deflector electrode 58). In the embodiment depicted in FIG. 1, the primary ion trap 60 is a mass analyser ion trap, such as an electrostatic orbital trap, and more specifically an Orbitrap™ FT mass analyser as made by Thermo Fisher Scientific.

As shown in FIG. 1, the orbital trap 60 comprises an inner electrode 61 elongated along the orbital trap axis and a split pair of outer electrodes 62, 63 which surround the inner electrode 61 and define therebetween a trapping volume in which ions are trapped and oscillate by orbiting around the inner electrode 61 to which is applied a trapping voltage whilst oscillating back and forth along the axis of the trap. The pair of outer electrodes 62, 63 function as detection electrodes to detect an image current induced by the oscillation of the ions in the trapping volume and thereby provide a detected signal.

The outer electrodes 62, 63 typically function as a differential pair of detection electrodes and are coupled to respective inputs of a differential amplifier (not shown in FIG. 1), which in turn forms part of a digital data acquisition system to receive the detected signal. The detected signal can be processed using Fourier transformation to obtain a mass spectrum of ions within the trap.

Figure 2:
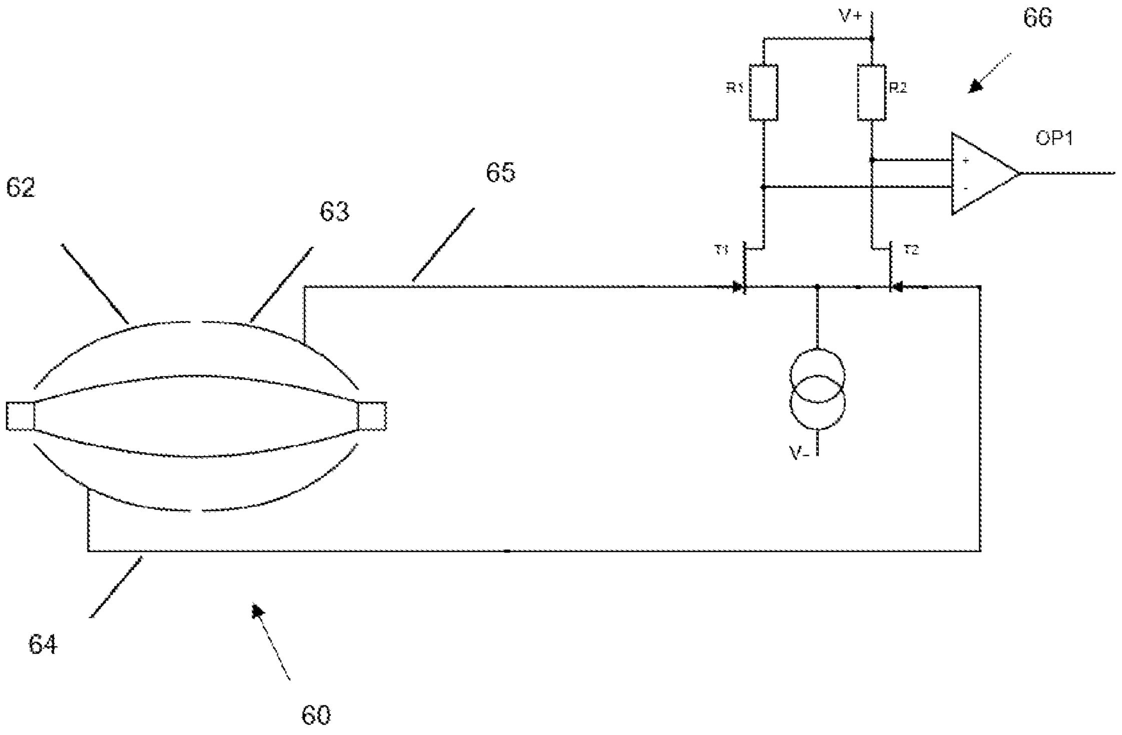
FIG. 2 shows schematically detail of a mass analyser in accordance with embodiments.

FIG. 2 shows schematically the electrostatic trap mass analyser 60 in more detail, together with its detection circuitry. An image current is detected using a differential amplifier on the first outer electrode 62 and second outer electrode 63 of the trap. The first outer electrode 62 and second outer electrode 63 are referred to as detection electrodes. First conductor 64 and second conductor 65 carry a first image current signal and a second image current signal respectively to pre-amplifier 66. The pre-amplifier 66 comprises a first amplifier transistor T2, a second amplifier transistor T1, first resistor R1, second resistor R2, and an operational amplifier OP1. The first amplifier transistor T2 and the second amplifier transistor T1 are connected as a differential pair, together with first resistor R1 and second resistor R2 and a constant current source forming a differential amplifier.

Further details on the detection circuitry shown in FIG. 2 are described in commonly assigned International Patent Publication No. WO 2012/152959.

Returning to FIG. 1, the mass spectrometer may optionally include a collision or reaction cell 40 downstream of the secondary ion trap 30. Where the collision or reaction cell 40 is present, ions collected in the secondary ion trap 30 can either be ejected orthogonally to the ion trap mass analyser 60 without entering the collision or reaction cell 40, or the ions can be transmitted axially to the collision or reaction cell 40 for processing before returning the processed ions to the ion trap 30 for subsequent orthogonal ejection to the mass analyser ion trap 60. The processing may comprise, for example, fragmenting the ions by collisions with a collision gas and/or a reagent in the collision cell 40, or further cooling the ions by collisions with a gas at a lower energy that does not fragment the ions.

As also shown in FIG. 1, the mass spectrometer is under the control of a control unit 70, such as an appropriately programmed computer, which controls the operation of various components of the spectrometer and, for example, sets the voltages to be applied to the various components of the spectrometer. The control unit 70 may also receive and process data from various components including the detector(s), e.g. perform Fourier transformation on detected signals. The control unit 70 is configured, amongst other things, to determine the settings (e.g. secondary ion trap 30 fill time, etc.) for the injection of ions into the primary trap 60 for analytical scans.

The mass spectrometer may be operated such that successive batches of ions from the ion source 10 are each accumulated in and analysed by the ion trap mass analyser 60. Each batch of ions is firstly accumulated in the secondary ion trap 30, and then the accumulated ions (or e.g. fragment ions derived from the accumulated ions) are injected into the mass analyser 60.

It is desirable that each batch of ions analysed by the mass analyser 60 includes as many ions as possible, so as to improve the statistics of the mass spectrum. However, undesirable space charge effects can occur at relatively high ion concentrations and can limit mass resolution and mass accuracy. Therefore, the total number of ions accumulated in the ion trap 30 is controlled to optimise the number of ions injected into the mass analyser 60 to be below, but as close as possible to, a limit for the mass analyser 60 such as the space-charge limit for the mass analyser 60. The total number of ions accumulated in the ion trap 30 may also or instead be controlled to be below a limit for the ion trap 30 such as the space-charge limit for the ion trap 30. Typically, between 1e4 and 1e6 elementary charges should be stored, such as between 1e5 and 5e5.

However, it may be the case that the flux of ions from the ion source 10 is highly variable. This is particularly the case where the ion source 10 is coupled to a separation device such as a liquid chromatography or capillary electrophoresis device, where the ion flux from the ion source 10 can vary over time by several order of magnitudes.

Therefore, the present embodiment uses so-called automatic gain control (AGC) techniques to precisely control the total number of ions accumulated in the ion trap 30 despite a variable flux of ions into the trap 30. These techniques typically rely on an accurate and reliable real-time estimation of the present ion current J or ion flux being received by the ion trap 30. Then, by controlling the filling time Tf of the ion trap 30, the total number of ions or the total amount of charge accumulated in the trap 30 (and injected into the mass analyser 60) can be suitably controlled.

Thus, a batch of ions that is to be injected into the mass analyser 60 is first stored in the secondary ion trap 30, where its total charge Q=J*Tf can be determined by the secondary ion trap filling time Tf during which the secondary ion trap 30 receives an ion current J from the ion source 10. The accumulation time (e.g. fill time) of ions in the trap 30 is adjusted based on an estimation of the present ion current J or ion flux to control the total number of ions accumulated in the ion trap. In this way, the total number of ions N injected into the mass analyser 60 per scan can then be controlled in order to achieve an appropriate signal-to-noise ratio while avoiding adverse space-charge effects caused by the analyser overfilling.

Ion flux estimations are also of importance, for example, for data dependent MS/MS measurements, where the ion flux is used to estimate the appropriate collision cell 40 filling time for precursor ions. Precursor ions (such as mass selected precursor ions) can be transmitted to the collision cell 40 by opening the ion trap's entrance gate 32 and exit gate 34, whereby the fill time is controlled using the entrance gate 32, e.g. by opening the entrance gate 32 for the desired fill time (and otherwise closing the entrance gate 32). The precursor ions are fragmented in the collision cell 40 to produce fragment ions, the fragment ions are transferred to the secondary ion trap 30, and the fragment ions are injected from the ion trap 30 into the mass analyser 60 for mass analysis. In these methods, the fill time for precursor ions in the collision cell 40 is used to in effect control the number fragment of ions injected into the mass analyser 60. It should be noted that multiple ion populations may be accumulated in the collision cell 40, e.g., as described in commonly assigned International Patent Publication No. WO 2006/103412.

The present ion flux can be estimated based on one or more measurements or estimations of an earlier ion flux into the trap 30. For example, the present ion flux can be estimated based on a measurement or estimation of the charge stored in the secondary ion trap 30 in one or several preceding scans, and then the secondary ion trap filling time Tf can be appropriately adjusted for subsequent scans.

An estimation of an earlier ion flux can be made based on the primary ion trap's 60 mass analysis of a previous batch of ions. For example, once a batch of ions has been mass analysed by the mass analyser 60, all of the signal in the resulting mass spectrum above a noise threshold may be summed, and converted to charge (or number of ions), e.g. using a conversion coefficient (which may, e.g., be determined during calibration). Determining the total charge of each successive batch of ions in this way provides a relatively frequent measure of the ion flux into the secondary ion trap 30, and can thereby allow the secondary ion trap filling time Tf time to be adjusted as needed relatively frequently.

However, it has been found that in some circumstances these methods can suffer from under-representation of ions. This is due to ion peaks appearing below the noise threshold or outside the mass range of the image current measurement. In Fourier transform mass spectrometers, signals in dense spectra can appear at reduced intensities due to interference effects. This effect is especially severe for mixtures of intact proteins where each protein has multiple isotopes at multiple charge states. Overall, this so-called "dark matter" can hide up to 50-70% of ion charge in such extreme cases. Estimation of the total charge number Q immediately from a mass analysis measurement may also be misleading because of spectral interference that suppresses signals from ions whose mass to charge ratios (m/z) are relatively close. This is especially a problem when multiply charged biological molecules like proteins with rich and dense isotopic clusters are analysed under moderate resolution settings. As a result of the charge underestimation, the secondary ion trap 30 filling time might be set by the AGC procedure to be inappropriately long for subsequent scans, which can lead the mass analyser 30 being overfilled.

Previously, an earlier ion flux has also been estimated by measuring the ion current of a batch of ions ejected to an electrometer positioned elsewhere in the instrument outside of the ion trap 60. For example, commonly assigned International Patent Publication No. WO2012/160001 describes a configuration in which an electrometer is located at the end of the collision or reaction cell 40. Such independent charge measurements can be used to calibrate or adjust ion flux estimations based on the primary ion trap's 60 mass analysis.

Although these methods can provide improved results, they require additional hardware with ultra-sensitive electronics and elaborate control. For example, independent charge detecting devices require dedicated extensions to the ion optics for detecting, measuring, and amplifying the ion beam impinging on a charge detecting electrode. Independent charge detection with an electrometer can also require extensions for the electronics.

Furthermore, an independent ion flux detector provides only an indirect assessment of the charge injected from the secondary ion trap 30 into the mass analyser 60; it may not consider actual transmission efficiency into the trap 60, which is known to be mass dependent. If the ion transfer efficiency into the mass analyser 60 changes, such loss of ions cannot be compensated by the electrometer measurement.

In the present embodiment, the detection electrode(s) 62, 63 of the mass analyser 60 itself are used in a mode of operation to determine an ion current of or a total amount of charge of a group of ions (instead of providing a separate independent ion flux detector elsewhere in the instrument to do this). This is done by deliberately causing a group of ions collected in the secondary ion trap 30 to impact upon one or more of the detection electrode(s) 62, 63 of the mass analyser 60. The inventors have found that the group of ions impacting upon the detection electrode(s) 62, 63 will produce a detected signal. The immediate impinging of the ions on one of the outer electrodes 62, 63 results in an electrical current which is converted to a voltage signal by the transimpedance amplifier. Moreover, the so-produced detected signal is indicative of the total amount of charge of the group of ions.

This can then be used to provide a fast and direct current measurement of the ion flux into the electrostatic ion trap 60. Such an ion current or charge measurement can in turn be used in an automatic gain control (AGC) procedure, for example to calibrate or adjust ion flux estimations based on the primary ion trap's 60 mass analysis.

Beneficially, by using the detection electrode(s) 62, 63 of the ion trap 60 itself to provide an ion current or charge measurement, there is no need to provide additional hardware elsewhere in the instrument for this purpose. This can then reduce the complexity, size and cost of the mass spectrometer, and increase its reliability and robustness. In some embodiments, this additional mode of operation does not require significant changes to the ion trap 60 or its detection circuitry. Furthermore, the measurements will more accurately take account of inevitable ion losses during the process of passing ions from the secondary ion trap 30 to the mass analyser 60, and so can result in a more accurate determination of the total number of ions accumulated in the mass analyser 60.

FIG. 1 illustrates the mass spectrometer being operated in a "normal" mass analysis mode of operation in which a mass spectrum of ions within the ion trap 60 is produced. Table 1 shows an example set of voltages applied to the various electrodes of the mass spectrometer for this mode of operation. It will be understood that the voltages shown in Table 1 are merely one non-limiting example; in practice any suitable combination of voltages can be used. The voltages given relate to the analysis of positively charged ions. For the analysis of negatively charged ions, the polarities of the voltages will be reversed.

Ions are ejected from the secondary ion trap 30 (C-Trap) towards the mass analyser 60 by applying ejection voltages to push and pull electrodes of the trap 30. When ions enter the mass analyser 60, the voltages applied to the central electrode 61 and to the deflector electrode 58 are dynamically changed from injection voltages to detection voltages. These voltages direct the ions into stable orbits lying in the space between the central electrode 61 and the outer electrodes 62, 63, where the ions orbit the central electrode 61 without touching any of the electrodes for an elongated time.

TABLE 1

Voltages applied when injecting ions into the Orbitrap for mass analysis.

| | Voltages/V |
|---|---|
| First outer electrode 62 | virtual ground |
| Second outer electrode 63 | virtual ground |
| Central electrode 61 (injection/detection) | −750/−1000 |
| Deflector electrode 58 (injection/detection) | 0/−160 |
| HV Focus Lens 56 | 210 |
| Z-Lens 54 | 65 |
| V-Lens 52 | −160 |
| C-Trap pull (fill/eject) | 0/400 |
| C-Trap push (fill/eject) | 0/(400 + 70) |

Figure 3:
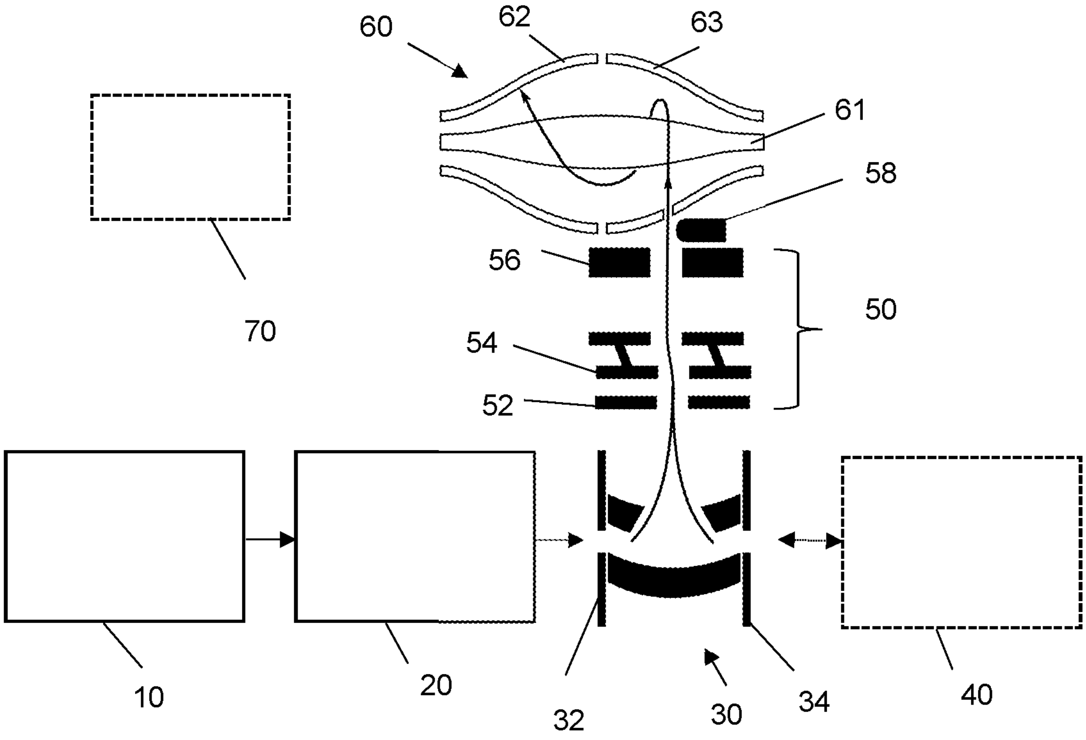
FIG. 3 shows schematically a mass spectrometer in accordance with embodiments.

FIG. 3 shows the mass spectrometer of FIG. 1 being operated a second, charge resolving mode of operation. FIG. 3 is similar to FIG. 1, except the ion path within the ion trap 60 is shown as impacting upon one of the outer electrodes 62.

As shown in FIG. 3, the outer electrodes 62, 63 of the mass analyser 60 are used for fast direct current measurement when a group of ions is ejected from the secondary ion trap 30 and accelerated towards the mass analyser 60 and finally impinge on one of the two outer electrodes 62, 63 of the mass analyser 60 immediately after injection. In this way, the mass analyser 60 is itself used to provide a direct ion current readout. Thus, the existing mass analyser 60 and its detection electronics are used in a new method of fast ion flux measurement.

In the present embodiment, to cause the group of ions to impact upon one of the outer electrodes 62, 63, static voltages are applied to the central electrode 61 and to the deflector electrode 58 of the mass analyser assembly. When constant voltages are applied to the central electrode 61 and to the deflector electrode 58, the energy of the ions is too high, such that the ions cannot be trapped in the potential well of the electrostatic trap 60. (This is in contrast with the normal operation of the orbital ion trap 60, when the central electrode 61 voltage is gradually changed leading to a drop in ion energy upon injection.) In consequence, the ions will either hit the first outer electrode 63 immediately after injection into the mass analyser's volume or impinge on the opposite second outer electrode 62 after the first flight around the central electrode 61, as shown in FIG. 3.

Table 2 shows one example of a set of DC voltages applied to the various electrodes for this new type of direct charge detection. It will again be understood that the voltages shown in Table 2 are merely one non-limiting example, and that in practice any suitable combination of voltages can be used. The voltages again relate to the analysis of positively charged ions; for the analysis of negatively charged ions, the polarities of the voltages will be reversed.

TABLE 2

Voltages applied when injecting ions into the Orbitrap for charge detection.

| | Voltages/V |
|---|---|
| First outer electrode 1 | virtual ground |
| Second outer electrode 2 | virtual ground |
| Central Electrode | −900 |
| Deflector Electrode | 100 |
| HV Focus Lens, L6 | 350 |
| Z-Lens | 65 |
| V-Lens | −160 |
| C-Trap Pull | 70 |
| C-Trap Push | 400 |

In the normal mass analysis mode of operation, the image current of oscillating ions is read out as a differential signal between the two outer electrodes 62, 63. Image current measurement of the oscillating ions are continued for an elongated time of up to few seconds. In the direct current detection mode of operation, the ion current is read out as an image current at the detection circuitry as well. However, the direct current measurement of ions impinging on one of the outer electrodes will happen in a relative short time period, e.g. of less than 1 ms. At least two separate electronic channels, i.e. for each of the two different methods of image current readout, may be provided for further data processing.

It will be appreciated that embodiments use the mass analyser assembly 60 without any mechanical changes to its design. The voltages applied at the electrodes are tuned such that ions ejected from the secondary trap 30 do not enter stable orbits within the primary mass analyser ion trap 60 and impinge directly one of the outer electrodes (such as on the second outer electrode 62, as shown in FIG. 3).

Figure 4:
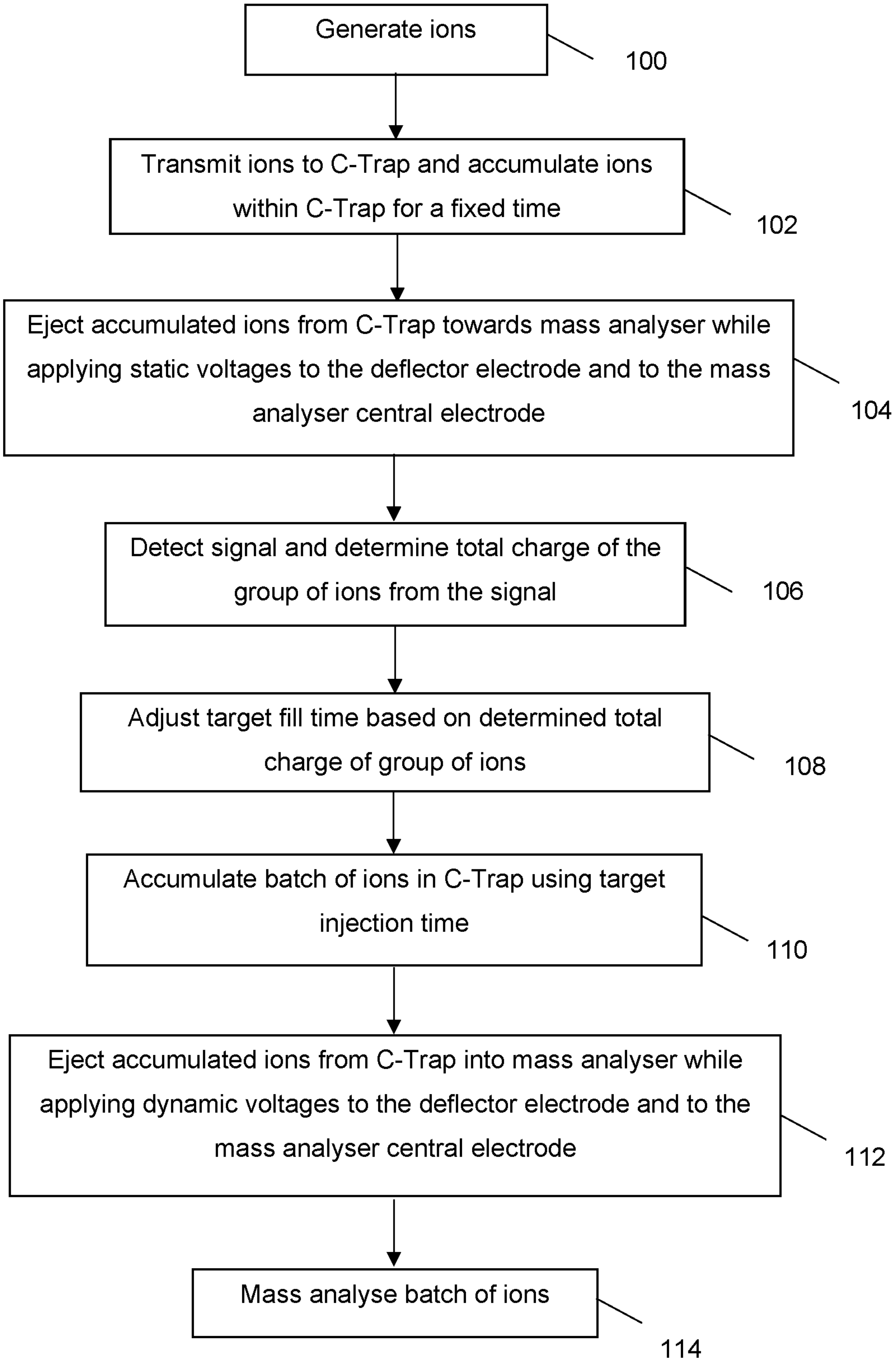
FIG. 4 shows schematically a method of operating a mass spectrometer in accordance with embodiments.

FIG. 4 illustrates a method in accordance with an embodiment, which may be carried out using the spectrometer shown in FIGS. 1-3.

As shown in FIG. 4, in a first step 100, ions are generated by the ion source 10. Ions generated by the ion source 10 are transmitted to the secondary ion trap 30 and accumulated therein for a set amount of time (step 102). The accumulated batch of ions is then ejected from the secondary ion trap 30 and transmitted towards the primary ion trap 60, while the instrument is operated in the charge detecting mode of operation, i.e. where static voltages are applied to the deflector electrode 58 and to the central electrode 61 (step 104). Under these voltage conditions, the batch of ions will impact upon one of the detection electrodes 62, 63. This produces a detected signal which is indicative of (e.g. proportional to) the total charge of the batch of ions, and so the total charge of the batch of ions can be determined from the detected signal (step 106).

The determined total charge is then used to adjust one or more subsequent target fill times for the secondary ion trap 30 in respect of one or more batches of ions that is to be mass analysed by the primary ion trap 60 (step 108). The adjusted target fill time is used when accumulating a subsequent batch of ions from the ion source 10 in the secondary ion trap 30, which is to be injected into the primary trap 60 for mass analysis (step 110). The accumulated batch of ions is then ejected from the secondary ion trap 30 and injected into the primary ion trap 60, while the instrument is operated in the mass analysis mode of operation, i.e. where dynamic voltages are applied to the deflector electrode 58 and to the central electrode 61 (step 112). Under these voltage conditions, the ions will take up stable orbits within the mass analyser 60 without touching any of the electrodes of the mass analyser 60 for an elongated time. The detected image current produced by the orbiting ions is Fourier transformed to produce a mass spectrum of the ions (step 114).

In the present embodiments, the determined total charge can be used to adjust subsequent target fill times in any suitable manner.

For example, the total charge of each successive batch of ions may be determined from the mass analysis of each batch of ions by the mass analyser 60. For each batch of ions mass analysed by the mass analyser 60, all of the signal in the mass spectrum above a noise threshold may be summed, and converted to charge (or number of ions), e.g. using a conversion coefficient (which may, e.g., be determined during calibration). The determined total ion charge may be used to calculate a target injection time for one or more subsequent batches of ions into the secondary ion trap 30 thereafter to be accumulated in the mass analyser 60.

In addition to this, charge detection measurements may be made intermittently between the mass analysis measurements. The measurement of ion current or charge may be carried out periodically and typically less frequently than mass analysis measurements. A charge detection measurement may be made, for example, once every few seconds (e.g., once every 5-10 s), between mass analysis measurements.

Then, the charge determined using the charge detection measurement may be compared to a corresponding charge determined using a mass analysis measurement. For example, a ratio of the charge determined using the charge detection measurement to the charge determined using the mass analysis measurement may be determined, and this ratio may be compared to an expected ratio. If the ratio different from the expected ratio, subsequent fill times into the secondary ion trap 30 can be adjusted accordingly to prevent overfilling or underfilling of the secondary ion trap 30 and/or primary ion trap 60.

Thus, the charge detection measurements can in effect be used to calibrate (e.g. scale) the charge estimations made using the mass analysis measurements.

Figure 5:
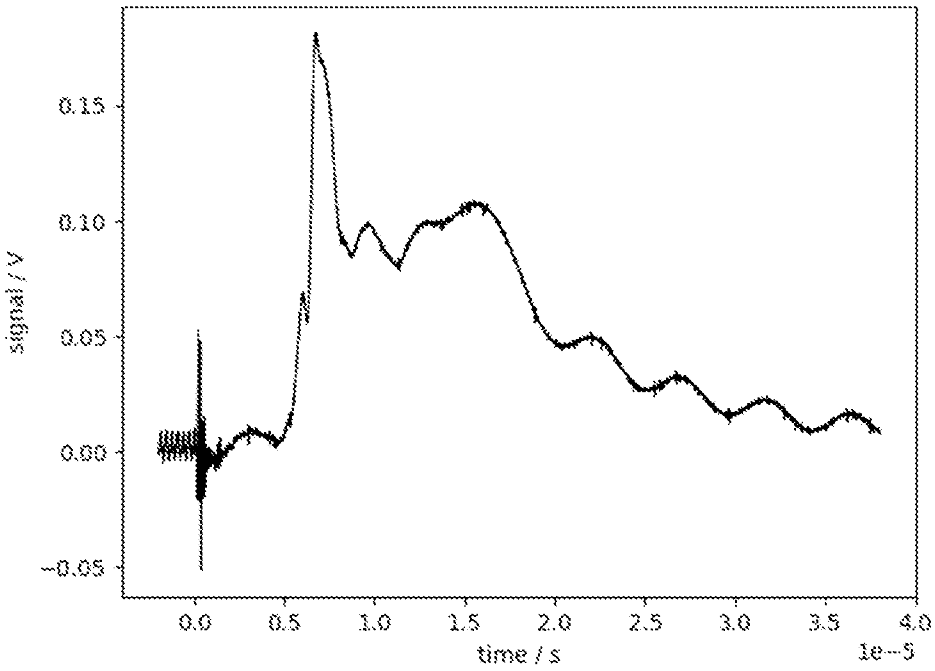
FIG. 5 shows a time dependent direct current readout measured by the voltage output of the transimpedance amplifier of an orbital electrostatic ion trap mass analyser configured in accordance with embodiments for Flexmix™ solution ions impinging on one of the outer electrodes of the mass analyser under fixed voltage conditions.

FIG. 5 shows a time dependent signal response of a direct infusion of a Flexmix™ solution that was measured using the charge detection mode of operation described above. In particular, FIG. 5 shows a time dependent direct current readout measured by the voltage output of the transimpedance amplifier for Flexmix™ solution ions impinging on one of the outer electrodes 62, 63 of the mass analyser 60 under fixed voltage conditions (mass range 150-2000 Th; secondary ion trap filling time 10 ms; ESI HV 4 kV). The time-dependent readout was monitored with an oscilloscope. In the experiments described herein, the C-trap filling time Tf was used as a measure of the ion total charge injected into the mass analyser 60.

After collisional cooling inside the C-Trap 30, the ions were ejected at time t0=0 μs towards the electrostatic orbital trap 60 with a 400V accelerating voltage. Within a total time of less than 40 μs, all of the ions ejected from the C-Trap 30 entered the mass analyser 60 through a slot in one of the outer electrodes 63 and finally hit the other outer electrode 62. It can be seen from FIG. 5 that the group of ions impacting upon the detection electrode(s) 62, 63 produces a detected signal. The immediate impinging of the ions on one of the outer electrodes 62, 63 results in an electrical current which is converted to a voltage signal by the transimpedance amplifier.

Figure 6:
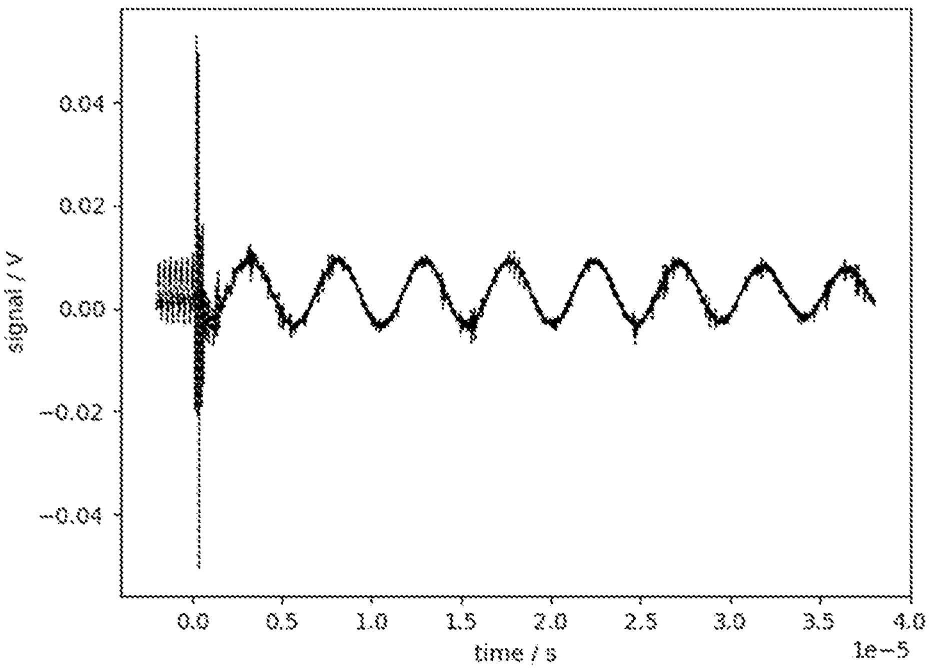
FIG. 6 shows a background current readout at the transimpedance amplifier of an orbital electrostatic ion trap mass analyser configured in accordance with embodiments measured in the absence of an ion flux.

FIG. 6 shows a background current readout at the transimpedance amplifier measured in the absence of an ion flux. To correct for the background signal, the signal response at the preamplifier was monitored while the electrospray voltage at the ESI source (and/or any other preceding ion optics) was turned off, thereby resulting in no ions entering the mass analyser assembly 60. The resulting background signal shown in FIG. 6 was subtracted from the signal of FIG. 5 measured under the ion load. Such interfering signals are, for example, known to be caused by the static voltage supply for the central electrode 61 of few hundred volts, where this voltage has a ripple of few (1, 2 or 3) millivolts and may be within a frequency range of 100 to 200 kHz.

Figure 7:
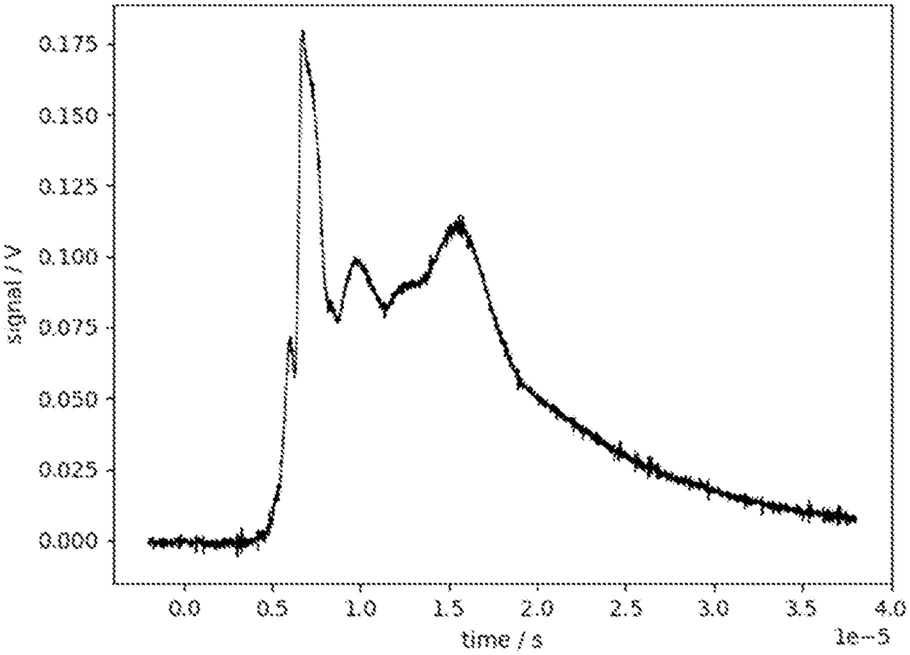
FIG. 7 shows a direct current readout at the transimpedance amplifier preamplifier of an orbital electrostatic ion trap mass analyser configured in accordance with embodiments under fixed voltage conditions, where the background of FIG. 6 has been subtracted.

FIG. 7 shows the direct current signal for a 10 ms C-Trap filling time of a selected mass range 150-2000, after the background signal of FIG. 6 has been subtracted. The noise signal observable in the background readout which can be clearly seen in FIG. 6 showing a 200 kHz frequency amplitude has been removed by subtraction of the background signal of FIG. 6.

In the present direct charge detection method, the ejection of ions from the C-Trap 30 towards the electrostatic orbitrap trap assembly 60 follows a time-of-flight dependency tof$\propto$ $(m/z)^{1/2}$ at a constant acceleration voltage ($eU=\frac{1}{2}mv^2$). Ions with lower mass to charge ratios (m/z) travel faster and therefore arrive at the first outer electrode 62 or second outer electrode 63 before ions having higher mass to charge ratios (m/z). So, the travelling distance between the C-trap 30 and the electrostatic orbital trap assembly 60 also serves as a low-resolution linear time-of-flight mass spectrometer.

Figure 8:
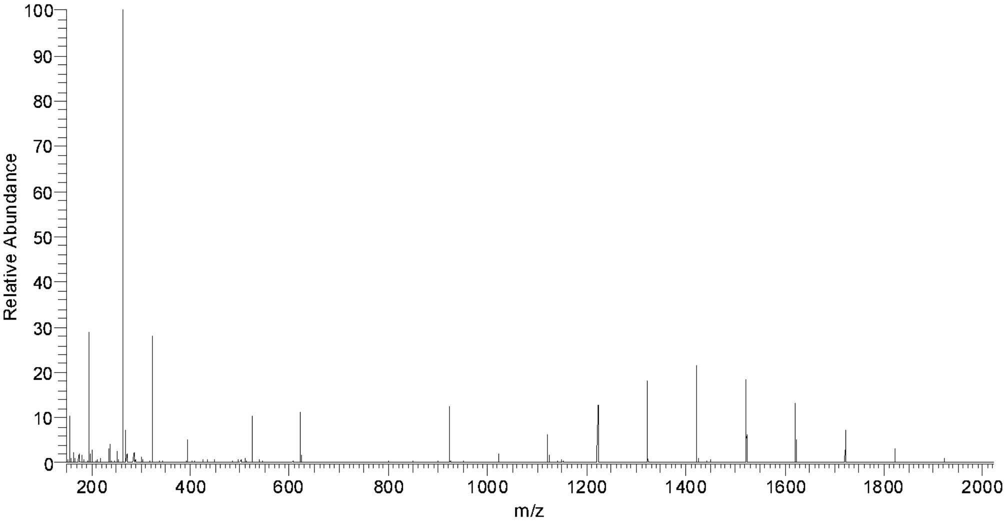
FIG. 8 shows a mass spectrum of Flexmix™ solution for the mass range m/z 150-2000 measured using an orbital electrostatic ion trap mass analyser.

FIG. 8 shows a mass spectrum of Flexmix™ solution covering the mass range m/z 150-2000 measured using the mass analyser 60 with resolution settings of 15000 (at m/z 200). The resolutions of the mass spectra shown in FIGS. 7 and 8 differ significantly. However, the relative signal intensities and arrival times measured in the direct current readout of FIG. 7 are in good agreement with the relative intensities of the mass analyser 60 measurement of FIG. 8.

The distance from the C-Trap 30 to the electrostatic orbital trap 60 of about 8.5 cm and the acceleration voltage of 400V from the C-Trap 30 to the virtually grounded electrostatic orbital trap 60 is sufficient to ensure a broad time dependent mass to charge ratio separation of the different Flexmix™ solution compounds.

The highest abundant signal in FIG. 8 is the doubly charged MRFA peptide at m/z 262. The highest abundant signal in the direct current measurement of FIG. 7 represents detection of the doubly charged MRFA peptide with an arrival time at the second outer electrode of t=6.6 μs. The different Ultramark compounds covering the mass range 922-1822 result in a broad unresolved hump measured in the direct current signal of FIG. 7 in the time range from 12 μs to 18 μs.

Figure 9A:
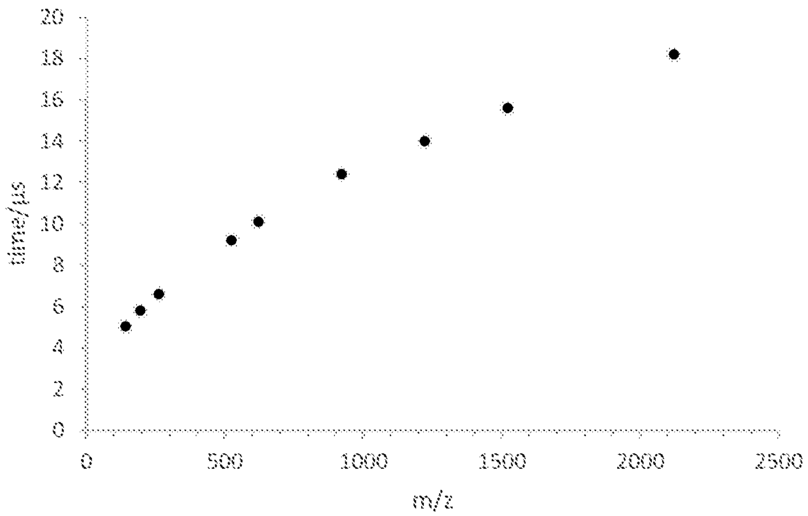
FIG. 9A shows arrival times measured for isolated Flexmix™ solution compounds measured at the maximum intensity of the direct current readout at the preamplifier of an orbital electrostatic ion trap mass analyser configured in accordance with embodiments.
Figure 9B:
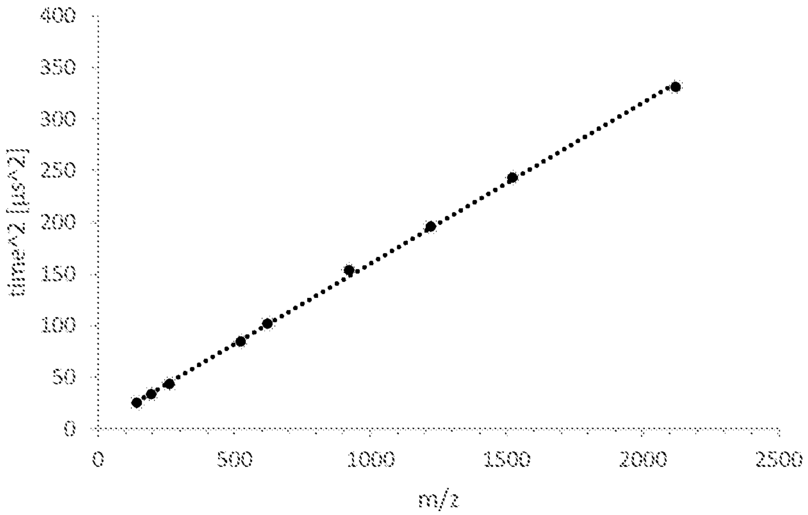
FIG. 9B shows the square of the arrival times of FIG. 9A.

To confirm the mass-dependent arrival at the second outer electrode, different Flexmix™ solution compounds were separately selected using a 10 Th isolation window in a quadrupole mass filter. The arrival time measurements are shown in FIG. 9. FIG. 9A shows the measured arrival time and FIG. 9B shows the square of the arrival time measured for different isolated Flexmix™ solution compounds. The linear trend shown in FIG. 9B confirms the expected energy dependent time of flight for the direct charge detection of the individual Flexmix™ solution compounds.

Thus, another advantage of the direct charge detection method of embodiments that uses the electrostatic orbital trap 60 itself is that it provides m/z dependent charge detection.

This m/z dependent charge detection is particularly advantageous in that it allows most or all unexpected (or "hidden") ions to be detected and identified. For example, it allows for detection and identification of most or all ions that are outside the pre-set mass range of the mass analyser 60, i.e. that may be chosen by the operator of the instrument. As described above, such "dark matter" ions can reduce the quality of the mass analysis. These ions can also be unpredictable when using the known m/z independent charge detection arrangements, such as those in which an electrometer is located elsewhere in the instrument outside of the ion trap.

Thus, the mass dependent electrometer measurement of various embodiments allows a more precise AGC calculation.

It will also be appreciated that the m/z resolution of the charge measurement is relatively low. For example, in the experiments shown, the resolution at m/z 1222 can be estimated as being approximately 6. Beneficially, this means that a high-speed analogue to digital converter (ADC) is not required to accurately sample the signal. For example, approximately 10-50 channels, such as 20-50 channels, are sufficient to convert the signal. This means that the total charge can be accurately calculated from the signal without requiring additional relatively complex and costly electronics.

For an independent charge detection method, the signal response should ideally be linear for a wide range of ion flux, and should be independent of the mass-to-charge position. In order to test this, different isolated Flexmix™ solution compounds were measured.

Figure 10:
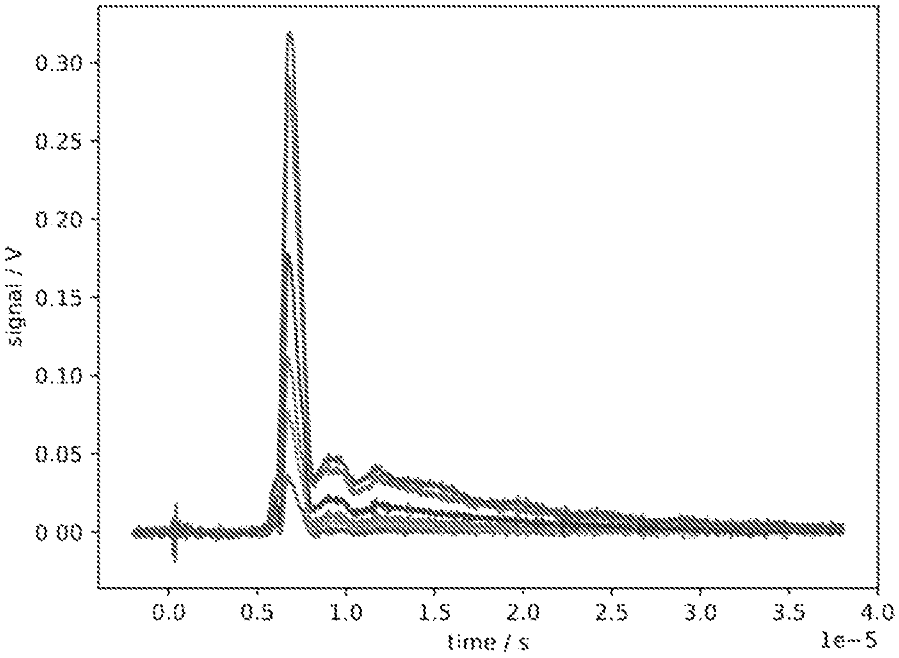
FIG. 10 shows direct current readouts of isolated doubly charged MRFA (m/z 262) for different C-Trap filling times at the preamplifier of an orbital electrostatic ion trap mass analyser configured in accordance with embodiments under fixed voltage conditions after subtracting the background signal.

One example for the direct current signal response of a mass selected compound is given in FIG. 10. FIG. 10 shows direct current readouts of an isolated doubly charged MRFA (m/z 262) for different C-Trap filling times at the preamplifier under fixed electrostatic orbital trap 60 voltage conditions after subtracting the background signal. The quadrupole centre mass was 262 Th, with an isolation width of 10 Th. The ESI voltage was set at 4 kV. Results for filling times of 1.25, 2.5, 5.0, 10, 20 and 50 ms are shown.

Figure 11:
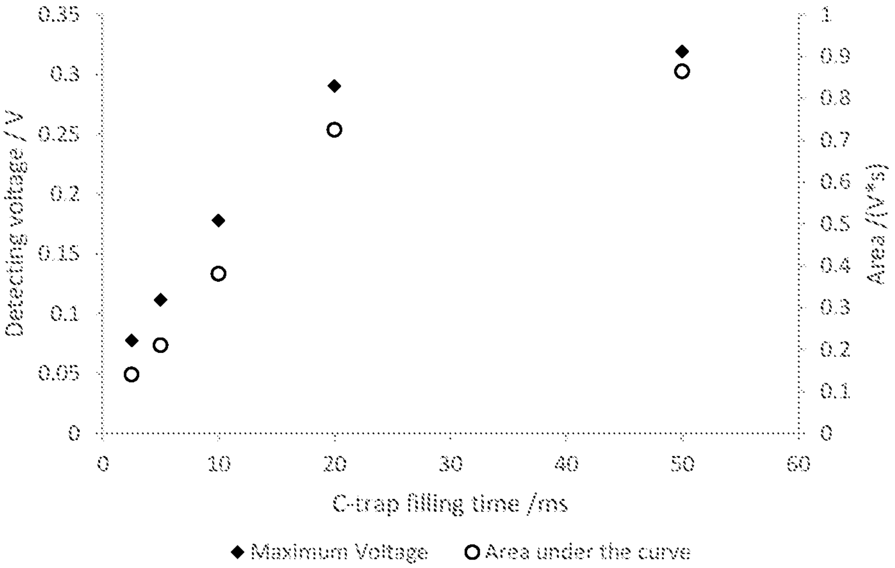
FIG. 11 shows the maximum detected voltage and measured area under the curve of the isolated doubly charged MRFA (m/z 262) for various C-trap filling times measured using an orbital electrostatic ion trap mass analyser configured in accordance with embodiments under fixed voltage conditions after subtracting the background signal.

The area under the curve is expected to represent the total charge number. The number of ions (and thus the charge) is proportional to the time during which the C-trap is filled with a constant ion flux generated by the ESI ion source 10. FIG. 11 plots the measured maximum voltage and the area under the curve versus the C-trap filling time for the isolated doubly charged MRFA peptide (m/z=262 Th).

It can be seen from FIG. 11 that both measured values (the maximum detected voltage, and the area under the curve) are linear with the C-trap filling time up to 20 ms. For longer C-trap filling times, the detected voltage and the area under the curve tend to saturation. For higher C-Trap filling times than 20 ms, the space charge capacity limits of the C-Trap for the mass selected doubly charged MRFA is reached, and in consequence the ion current signal at the outer electrode of the electrostatic orbital trap 60 flattens out. It will be understood that the data in FIG. 11 is for the particular instrument used in the experiments, and that in other instruments, saturation will start after some other amount of time, and e.g., may start after a few ms.

Figure 12:
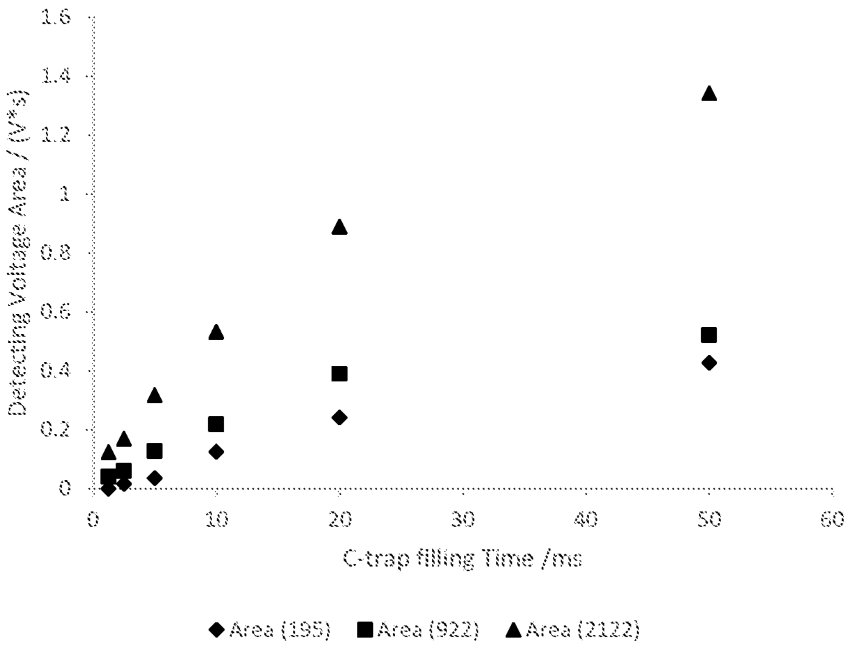
FIG. 12 shows measured areas under the curves for isolated caffeine (m/z 195) and for two different ultramark compounds (m/z 922 and 2122) for different C-Trap filling times measured using an orbital electrostatic ion trap mass analyser configured in accordance with embodiments under fixed voltage conditions.

To further prove the linearity of the area under the curve of the detected voltage, three different isolated compounds from Flexmix™ solution were selected. FIG. 12 shows the area under the curve of the detected signals versus C-trap filling times for isolated caffeine m/z 195 and two different ultramark compounds m/z 922 and 2122. The measurements were made under fixed electrostatic orbital trap 60 voltage conditions, an ESI voltage of 4 kV, with quadrupole isolation windows centred at m/z 195, 922, or 2122 Th, with an isolation width 10 Th. C-trap filling times of 1.25, 2.5, 5.0, 10, 20 and 50 ms were used.

Figure 13:
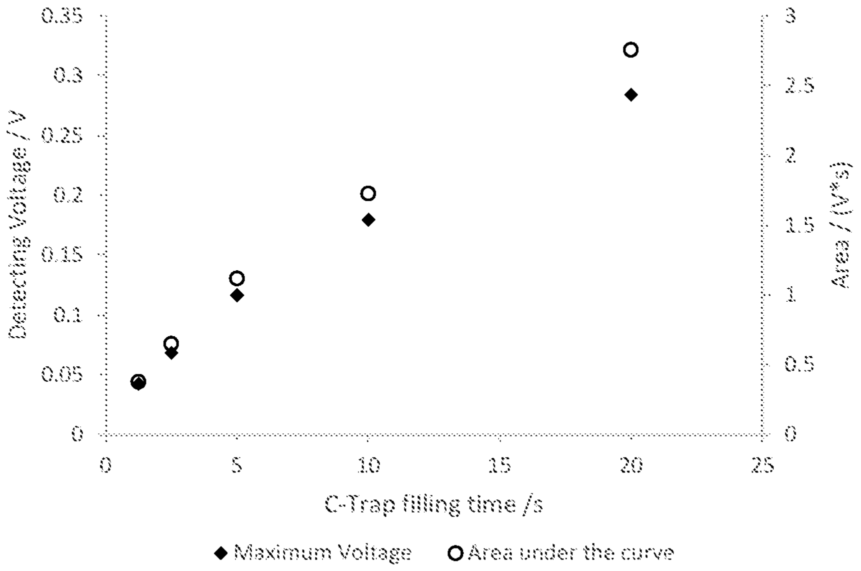
FIG. 13 shows the maximum detected voltage and measured area under the curve of Flexmix™ solution for different C-Trap filling times measured using an orbital electrostatic ion trap mass analyser configured in accordance with embodiments under fixed voltage conditions.

FIG. 13 shows the measured maximum detected voltage and the area under the curve versus the C-trap filling time of Flexmix™ solution for the selected mass range 150-2000 Th. The wide mass range is selected to show that the charge detection is fast enough to accurately measure not only the isolated ion species. The area under the curve increases linearly with the C-Trap filling times up to around 10 ms for Flexmix™ solution.

Thus, a group of ions impacting upon the detection electrode(s) 62, 63 in manner of embodiments produces a detected signal that is proportional to the ion current of and/or the total amount of charge of the group of ions.

It will accordingly be appreciated that embodiments provide a method and apparatus for fast independent charge detection. The electrostatic orbital trap 60 apparatus is unchanged while the dynamic applied voltages are turned off, to enable a direct current measurement of ions impinging on the detecting electrode(s) 62, 63. This requires only minor modifications to the existing electronics.

In contrast to the normal electrostatic orbital trap 60 mass analysis mode, the direct current measurement requires static voltages at the central electrode 61 and the deflector electrode 58 of the electrostatic orbital trap 60. For isolated compounds and for larger mass ranges, the integrated measured detected voltage is linear within the typical C-Trap filling times of 1.25 to 20 ms.

It will be appreciated that the independent charge detection described herein does not require any additional mechanical parts, because the mass analyser 60 itself is both used as a highly accurate and high resolving mass analyser and as a fast charge detecting electrometer device. For the independent charge detection, minor modifications of the preamplifier of the mass analyser detection circuitry may be required. No or just minor changes are needed to the design of the mass analyser's central electrode and deflector voltage supplies.

In the normal mass detecting mode of operation, the central electrode voltage and the deflector voltage are switched from (a) injection voltages to (b) detecting voltages. In embodiments, the dynamic mode of the electronics can be delayed, e.g. for several hundred microseconds, to enable a virtual static mode for the independent direct current measurement which requires less than 20 μs. In consequence the direct current measurement is possible, if the dynamic mode is required for every ejection event to the mass analyser 60 as the switch to the dynamic mode could be triggered after 20 μs when the impinging of the ion bunch on one of the outer electrodes 62, 63 already has happened before.

The method allows rapid (in the course of tens of microseconds) measurement of the ion charge injected into the mass analyser 60. The method utilizes existing mass analyser electrodes and electronics, and does not require any mechanical modifications. This low-cost design is of high interest for low cost instruments and or for compact mass detecting devices. The direct current method described herein is faster than an electrostatic orbital trap 60 pre-scan which typical takes 32 ms or longer and requires less computational effort than a Fourier Transformation of Orbitrap pre-scan.

Although various particular embodiments have been described above, various alternative embodiments are possible.

For example, the type of ion trap is not limited to an electrostatic orbital trap as described above. Any type of ion trap that uses image current detection could be used, such as for example multi-reflection and multi-deflection electrostatic traps and time-of-flight analysers, orbital traps, including of Cassini type, with one or multiple inner electrodes, linear and 3D traps with RF trapping, and so on.

In some embodiments, an additional electrode 67 can be placed behind the deflector electrode 58. In such a setup the ion bunch ejected from the C-Trap 30 should be focused by the applied voltages to impinge on the additional electrode 67. The additional electrode 67 can either be electrical connected to the first outer electrode 63 or it can alternatively be connected to a separate charge detecting device.

Figure 14:
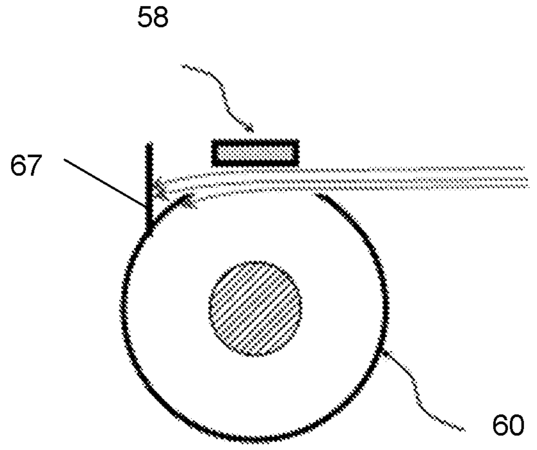
FIG. 14 shows schematically a mass analyser in accordance with embodiments.

FIG. 14 illustrates one such embodiment. As illustrated by FIG. 14, a screen electrode 67 is arranged adjacent to, e.g. slightly behind, the injection slot of the ion trap mass analyser 60. The screen electrode 67 is electrically connected (e.g. spot welded) to an outer electrode 63, 64 of the ion trap mass analyser 60. When it is desired to measure the ion current or charge of a packet of ions ejected from the C-Trap 30, the deflector 58 is operated with at a low voltage, e.g. so as to just deflect ions away from it, while the central electrode of the ion trap mass analyser 60 may be kept at a low voltage or at ground. The voltages are configured to minimise the share of the ions that are sent through the injection slot into the ion trap mass analyser 60, and to instead direct them to the screen electrode 67 behind the injection slot. This allows the ion current or charge of the packet of ions to be measured using the ion trap mass analyser's electronics (as described above). In addition, and advantageously, most contamination is now deposited on the screen electrode 67 and not on the internal surface of the detection electrode(s) 63, 64 which should be kept clean for as long as possible.

In general, an additional dedicated ion current or charge detecting electrode may be arranged either (i) between the C-Trap 30 and the ion trap mass analyser 60, e.g. adjacent to the deflector electrode 58; (ii) within the mass analyser 60, e.g. directly behind the entrance aperture or slot of the mass analyser 60; or (iii) adjacent to the mass analyser 60, e.g. behind the mass analyser 60, whereby ions passed from the C-Trap 30 to the mass analyser 60 can be selectively either trapped within the mass analyser 60 or can be caused to travel beyond the mass analyser 60 and to impact upon the additional electrode, e.g. by suitable control of a voltage applied to a defector electrode.

Although these embodiments add some additional complexity to the instrument, they can still improve the accuracy of the ion current or charge measurements, because the measurements will more accurately take account of inevitable ion losses during the process of passing ions to the ion trap 60; e.g. as compared to measurements made using an electrometer positioned elsewhere in the instrument outside of the ion trap that will not take account of these losses and will instead take account of the (different) ion losses that occur during the process of transmitting ions to the electrometer.

Although the present invention has been described with reference to various embodiments, it will be understood that various changes may be made without departing from the scope of the invention as set out in the accompanying claims.

The invention claimed is:

1. A method of operating an analytical instrument that comprises an ion trap, the ion trap comprising one or more detection electrodes, wherein one or more of the detection electrode(s) are configured to detect image current signals from ions accumulated within the ion trap, the method comprising:

operating the instrument in a first mode of operation in which ions passed to the ion trap are caused to impact upon one or more of the detection electrode(s) of the ion trap, and passing a group of ions to the ion trap such that the group of ions is caused to impact upon one or more of the detection electrode(s) of the ion trap so as to provide a detected signal;

determining an ion current or charge of the group of ions from the detected signal; and using the determined ion current or charge of the group of ions to control the number of ions in a batch of ions subsequently accumulated in the ion trap;

wherein in the first mode of operation, ions are caused to impact upon one or more of the one or more detection electrode(s) that are configured to detect image current signals from ions accumulated within the ion trap; or wherein in the first mode of operation, ions are caused to impact upon one or more of the one or more detection electrode(s) that are electrically connected to one or more of the detection electrode(s) that are configured to detect image current signals from ions accumulated within the ion trap.

2. The method of claim 1, further comprising:

operating the instrument in a second mode of operation in which ions passed to the ion trap are caused to become trapped within the ion trap;

accumulating the batch of ions in the ion trap; and analysing the batch of ions by using the one or more detection electrodes to detect image current signals from the batch of ions accumulated within the ion trap.

3. The method of claim 2, wherein:

operating the instrument in the first mode of operation comprises applying a first set of one or more voltages to the ion trap, wherein the first set of one or more voltages is configured to cause ions passed to the ion trap to impact upon one or more of the detection electrode(s) of the ion trap; and operating the instrument in the second mode of operation comprises applying a second different set of one or more voltages to the ion trap, wherein the second set of one or more voltages is configured to cause ions passed to the ion trap to become trapped within the ion trap.

4. The method of claim 3, wherein:

the first set of one or more voltages includes one or more constant voltages; and the second set of one or more voltages includes one or more dynamic voltages.

5. The method of claim 2, wherein the ion trap is an electrostatic ion trap having an inner electrode arranged along an axis and two outer detection electrodes spaced apart along the axis and surrounding the inner electrode;

wherein operating the instrument in the first mode of operation comprises applying a constant voltage to the inner electrode; and wherein operating the instrument in the second mode of operation comprises varying the voltage applied to the inner electrode.

6. The method of claim 2, wherein passing the group of ions to the ion trap comprises passing the group of ions to the ion trap via one or more ion optical devices arranged upstream of the ion trap;

wherein operating the instrument in the first mode of operation comprises applying a first set of one or more voltages to the one or more ion optical devices, wherein the first set of one or more voltages is configured to cause ions passed to the ion trap to impact upon one or more of the detection electrode(s) of the ion trap; and wherein operating the instrument in the second mode of operation comprises applying a second different set of one or more voltages to the one or more ion optical devices, wherein the second set of one or more voltages is configured to cause ions passed to the ion trap to become trapped within the ion trap.

7. The method of claim 6, wherein:

the first set of one or more voltages includes one or more constant voltages; and the second set of one or more voltages includes one or more dynamic voltages.

8. The method of claim 2, wherein the one or more ion optical devices comprise a deflector arranged adjacent to an ion entrance of the ion trap;

wherein operating the instrument in the first mode of operation comprises applying a constant voltage to the deflector; and wherein operating the instrument in the second mode of operation comprises varying the voltage applied to the deflector.

9. The method of claim 1, wherein the ion trap is a primary ion trap, and the method comprises:

accumulating the group of ions within a secondary ion trap arranged upstream of the primary ion trap;

wherein the step of passing the group of ions to the ion trap comprises passing the group of ions from the secondary ion trap to the primary ion trap, optionally via the one or more ion optical devices.

10. The method of claim 9, comprising accumulating the group of ions within the secondary ion trap for a set fill time.

11. The method of claim 9, comprising accumulating the batch of ions in the ion trap by:

accumulating the batch of ions within the secondary ion trap; and passing the batch of ions from the secondary ion trap to the primary ion trap, optionally via the one or more ion optical devices, so as to accumulate the batch of ions within the primary ion trap.

12. The method of claim 9, wherein the secondary ion trap is a linear ion trap such as a curved linear ion trap.

13. The method of claim 1, wherein the method comprises:

subtracting a background signal from the detected signal, wherein the background signal is a signal measured by operating the ion trap in the first mode of operation without passing ions to the ion trap; and determining the ion current or charge of the group of ions from the detected signal with the background signal subtracted.

14. The method of claim 9, wherein the method comprises controlling the number of ions in the batch of ions subsequently accumulated in the ion trap by controlling a fill time of ions into the primary ion trap or by controlling a fill time of ions into the secondary ion trap.

15. The method of claim 2, wherein the method comprises:

operating the instrument in the second mode of operation and accumulating a batch of ions in the ion trap, using the one or more detection electrodes to detect image current signals from the batch of ions accumulated within the ion trap, determining an ion current or charge of the group of ions from the image current signals, and using the determined ion current or charge of the batch of ions to determine a target fill time for a batch of ions subsequently accumulated in the ion trap;

comparing the determined ion current or charge of the group of ions to the determined ion current or charge of the batch of ions; and adjusting the target fill time based on the comparison.

16. The method of claim 2, wherein the ion trap comprises detection circuitry comprising a set of one or more transistors, and wherein the same set of one or more transistors is used for both ion current or charge detection in the first mode of operation and for image current detection in the second mode of operation.

17. A method of operating an analytical instrument that comprises a primary ion trap and a secondary ion trap arranged upstream of the primary ion trap, the method comprising:

accumulating a group of ions within the secondary ion trap;

operating the instrument in a first mode of operation in which ions passed from the secondary ion trap to the primary ion trap are caused to impact upon one or more electrodes arranged between the secondary ion trap and the primary ion trap or adjacent to the primary ion trap, and passing the group of ions from the secondary ion trap to the primary ion trap such that the group of ions is caused to impact upon the one or more electrodes so as to provide a detected signal;

determining an ion current or charge of the group of ions from the detected signal; and using the determined ion current or charge of the group of ions to control the number of ions in a batch of ions subsequently accumulated in the primary and/or secondary ion trap.

18. The method of claim 17, wherein either:

the one or more electrodes are detection electrode(s) of an independent ion current or charge detector; or the primary ion trap comprises one or more detection electrodes configured to detect image current signals from ions accumulated within the primary ion trap, and the one or more electrodes are electrically connected to one or more of the detection electrode(s) of the primary ion trap.

19. The method of claim 17, wherein:

the instrument comprises a deflector arranged adjacent to an ion entrance of the primary ion trap;

in the first mode of operation, ions are caused to impact upon one or more electrodes arranged adjacent to the deflector; and the one or more electrodes are arranged adjacent to the deflector such that, when a deflection voltage is other than applied to the deflector, most or all ions passed from the secondary ion trap to the primary ion trap are caused to impact upon the one or more electrodes.

20. An analytical instrument comprising:

an ion source;

an ion trap, the ion trap comprising one or more detection electrodes, wherein one or more of the detection electrode(s) are configured to detect image current signals from ions accumulated within the ion trap; and a control system configured to:

operate the instrument in a first mode of operation in which ions passed to the ion trap are caused to impact upon one or more of the detection electrode(s) of the ion trap, and cause a group of ions from the ion source to be passed to the ion trap such that the group of ions impacts upon one or more of the detection electrode(s) of the ion trap so as to provide a detected signal;

determine an ion current or charge of the group of ions from the detected signal; and use the determined ion current or charge of the group of ions to control the number of ions in a batch of ions subsequently accumulated in the ion trap;

wherein the instrument is configured such that, in the first mode of operation, ions are caused to impact upon one or more of the one or more detection electrode(s) that are configured to detect image current signals from ions accumulated within the ion trap; or wherein the instrument is configured such that, in the first mode of operation, ions are caused to impact upon one or more of the one or more detection electrode(s) that are electrical connected to one or more of the detection electrode(s) that are configured to detect image current signals from ions accumulated within the ion trap.

* * * * *